(12) United States Patent
Ge et al.

(10) Patent No.: US 11,902,860 B2
(45) Date of Patent: Feb. 13, 2024

(54) COMMUNICATION METHOD AND DEVICE

(71) Applicant: HUAWEI TECHNOLOGIES CO., LTD., Guangdong (CN)

(72) Inventors: Cuili Ge, Beijing (CN); Yanmei Yang, Beijing (CN); Jiangwei Ying, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 399 days.

(21) Appl. No.: 17/358,310

(22) Filed: Jun. 25, 2021

(65) Prior Publication Data

US 2021/0321227 A1 Oct. 14, 2021

Related U.S. Application Data

(63) Continuation of application No. PCT/CN2019/127203, filed on Dec. 20, 2019.

(30) Foreign Application Priority Data

Dec. 28, 2018 (CN) .......................... 201811628430.2

(51) Int. Cl.
*H04W 4/06* (2009.01)
*H04W 4/40* (2018.01)
*H04W 72/00* (2023.01)
*H04W 48/10* (2009.01)
*H04W 72/30* (2023.01)
*H04L 12/18* (2006.01)
*H04W 92/18* (2009.01)

(52) U.S. Cl.
CPC ............... *H04W 4/06* (2013.01); *H04W 4/40* (2018.02); *H04W 48/10* (2013.01); *H04W 72/30* (2023.01); *H04L 12/189* (2013.01); *H04W 92/18* (2013.01)

(58) Field of Classification Search
CPC .......... H04W 4/06; H04W 4/40; H04W 4/02; H04W 48/10; H04W 72/30; H04W 92/18;
(Continued)

(56) References Cited

U.S. PATENT DOCUMENTS

2017/0330457 A1 11/2017 Bhalla
2018/0077241 A1 3/2018 Byun et al.
(Continued)

FOREIGN PATENT DOCUMENTS

CN 106470383 A 3/2017
CN 106488386 A 3/2017
(Continued)

OTHER PUBLICATIONS

Catt, KI#4: Completing the PC5 QoS for broadcast. SA WG2 Meeting #129bis, Nov. 26-30, 2018, West Palm Beach, USA, S2-1812857, 5 pages.

(Continued)

*Primary Examiner* — Candal Elpenord

(57) ABSTRACT

Embodiments of this application disclose a communication method and device, and relate to the communications field, to efficiently deliver a vehicle-to-everything (V2X) message by using limited bandwidth resources of PC5. The method includes: receiving, by a first node, PC5 broadcast reference information from a second node, where the PC5 broadcast reference information is used to indicate to send target data from the second node in a PC5 interface broadcast mode; and sending, by the first node, the target data in the PC5 interface broadcast mode based on the PC5 broadcast reference information.

17 Claims, 9 Drawing Sheets

(58) Field of Classification Search
CPC ............ H04W 84/005; H04L 12/189; H04L 12/1895; H04L 67/12
USPC ................................................ 370/329–330
See application file for complete search history.

(56) References Cited

U.S. PATENT DOCUMENTS

| | | | | |
|---|---|---|---|---|
| 2018/0077518 | A1* | 3/2018 | Nguyen | G08G 1/096791 |
| 2021/0219116 | A1* | 7/2021 | Perras | H04W 4/08 |
| 2021/0410084 | A1* | 12/2021 | Li | H04W 52/265 |
| 2022/0053513 | A1* | 2/2022 | Ryu | H04W 72/1263 |

FOREIGN PATENT DOCUMENTS

| | | |
|---|---|---|
| CN | 106982455 A | 7/2017 |
| CN | 107645710 A | 1/2018 |
| WO | 2017014514 A1 | 1/2017 |
| WO | 2017028603 A1 | 2/2017 |
| WO | 2017074154 A1 | 5/2017 |
| WO | 2018227039 A1 | 12/2018 |

OTHER PUBLICATIONS

3GPP TS 36.321 V15.3.0 (Sep. 2018), 3rd Generation Partnership Project; Technical Specification Group Radio Access Network; Evolved Universal Terrestrial Radio Access (E-UTRA); Medium Access Control (MAC) protocol specification (Release 15), 127 pages.

3GPP TS 23.303 V15.1.0 (Jun. 2018), 3rd Generation Partnership Project; Technical Specification Group Services and System Aspects; Proximity-based services (ProSe); Stage 2 (Release 15), 130 pages.

3GPP TS 24.386 V15.2.0 (Dec. 2018), 3rd Generation Partnership Project; Technical Specification Group Core Network and Terminals; User Equipment (UE) to V2X control function; protocol aspects; Stage 3 (Release 15), 35 pages.

M. Handley et al., SDP: Session Description Protocol. RFC4566, Jul. 2006, 49 pages.

IEEE Std 1609.3-2016. IEEE Standard for Wireless Access in Vehicular Environments (WAVE)—Networking Services. IEEE Vehicular Technology Society, 160 pages.

Office Action issued in CN201811628430.2, dated Jan. 25, 2021, total 9 pages.

International Search Report and Written Opinion issued in PCT/CN2019/127203, dated Mar. 13, 2020, total 9 pages.

3GPP TR 23.795 V1.0.0 (Jun. 2018), 3rd Generation Partnership Project; Technical Specification Group Services and System Aspects; Study on application layer support for V2X services; (Release 16), 55 pages.

3GPP TS 23.285 V15.1.0 (Jun. 2018), 3rd Generation Partnership Project; Technical Specification Group Services and System Aspects; Architecture enhancements for V2X services (Release 15), 36 pages.

Extended European Search Report issued in EP19905953.6, dated Jan. 17, 2022, 9 pages.

* cited by examiner

COMMUNICATION METHOD AND DEVICE

CROSS-REFERENCE TO RELATED APPLICATIONS

This application is continuation of International Application No. PCT/CN2019/127203, filed on Dec. 20, 2019, which claims priority to Chinese Patent Application No. 201811628430.2, filed on Dec. 28, 2018. The disclosures of the aforementioned applications are hereby incorporated by reference in their entireties.

TECHNICAL FIELD

Embodiments of this application relate to the communications field, and in particular, to a communication method and device for delivering messages.

BACKGROUND

In a vehicle-to-everything (V2X) communications system, there are a plurality of different types of V2X messages, for example, a vehicle-to-vehicle (V2V) message, a vehicle-to-pedestrian (V2P) message, a vehicle-to-network (V2N) message, a vehicle-to-infrastructure (V2I) message, an anti-collision message between vehicles, an entertainment application message, and a navigation message exchanged between vehicles.

When a V2X application server sends a V2X message to all terminals in one area, the V2X application server usually sends the V2X message to a relay device, and the relay device receives the V2X message from the V2X application server and sends the V2X message to the terminals through a PC5 interface in a point-to-point mode. Because of limited bandwidth resources of PC5, the PC5 cannot support the relay device in establishing unicast communication links with all the terminals. Consequently, the V2X message from the V2X application server cannot be quickly delivered to the terminals, and data delivery efficiency is very low.

SUMMARY

Embodiments of this application provide a communication method and device, to efficiently deliver a V2X message by using limited bandwidth resources of PC5.

To achieve the foregoing objective, the following technical solutions are used in the embodiments of this application.

According to a first aspect, a communication method is disclosed. The communication method includes the following:

A first node receives PC5 broadcast reference information from a second node. The PC5 broadcast reference information is used to indicate to send target data from the second node in a PC5 interface broadcast mode. The first node may send the target data in the PC5 interface broadcast mode based on the PC5 broadcast reference information.

According to the method provided in this embodiment of this application, the first node determines, based on an indication of the PC5 broadcast reference information sent by the second node, to send the target data from the second node in the PC5 interface broadcast mode. The first node does not need to sequentially send the target data in a one-to-one manner in a PC5 interface unicast mode, but sends the target data in the PC5 interface broadcast mode, thereby saving PC5 bandwidth resources and achieving efficient data delivery.

With reference to the first aspect, in a first example embodiment of the first aspect, the PC5 broadcast reference information includes a target data filtering rule. The target data filtering rule is used to filter to obtain the target data. In addition, that the first node sends the target data in the PC5 interface broadcast mode based on the PC5 broadcast reference information includes: The first node filters data from the second node according to the target data filtering rule, to obtain the target data. The first node sends the target data in the PC5 interface broadcast mode.

In this embodiment of this application, the target data filtering rule is set, so that the first node can obtain the target data through filtering according to the target data filtering rule, and send the target data in the PC5 interface broadcast mode, thereby greatly improving data delivery efficiency.

With reference to the first example embodiment of the first aspect, in a second example embodiment of the first aspect, the PC5 broadcast reference information is carried in control signaling.

In this embodiment of this application, the second node sends a PC5 broadcast configuration message once on a control plane, so that the first node can continuously broadcast some data, thereby reducing signaling overheads while achieving efficient data delivery. In addition, if the first node is expected to be switched, provided that control plane signaling is sent to only a switched first node, the target data can be broadcast by the new first node. In addition, the target data can be updated only by changing the target data filtering rule carried in the control signaling. This is more flexible during implementation.

With reference to the first or second example embodiment of the first aspect, in a third example embodiment of the first aspect, the PC5 broadcast reference information further includes a PC5 broadcast indicator and/or target data broadcast frequency information. The PC5 broadcast indicator is used to indicate to send the target data in the PC5 interface broadcast mode, and the target data broadcast frequency information is used to indicate a frequency for broadcasting the target data.

In this embodiment of this application, the first node may more intuitively determine, based on the PC5 broadcast indicator, to send, in the broadcast mode, the target data obtained through filtering according to the target data filtering rule, or the first node may broadcast the target data based on the frequency indicated by the target data broadcast frequency information, thereby reducing signaling overheads of the first node, and reducing power consumption of the first node.

With reference to the first aspect, in a fourth example embodiment of the first aspect, that a first node receives PC5 broadcast reference information from a second node includes: The first node receives the target data from the second node, where the target data includes the PC5 broadcast reference information.

In this embodiment of this application, the first node may obtain the PC5 broadcast reference information by receiving the target data. The second node notifies, on a user plane, the PC5 broadcast reference information, so that a control granularity can be accurate to each data packet, thereby reducing negotiated signaling overheads. In this way, the signaling overheads are reduced while efficient data delivery is achieved.

With reference to the fourth example embodiment of the first aspect, in a fifth example embodiment of the first aspect, the PC5 broadcast reference information includes a PC5 broadcast indicator. The PC5 broadcast indicator is used to indicate to send the target data in the PC5 interface broadcast mode. That the first node sends the target data in the PC5 interface broadcast mode based on the PC5 broadcast reference information includes: The first node sends the target data in the PC5 interface broadcast mode based on the PC5 broadcast indicator.

In this embodiment of this application, the first node may obtain the PC5 broadcast indicator from the target data from the second node, and determine, based on the PC5 broadcast indicator, to send the target data in the PC5 interface broadcast mode, thereby achieving efficient data delivery.

With reference to any one of the first aspect or the first to fifth example embodiments of the first aspect, in a sixth example embodiment of the first aspect, the first node is a roadside unit RSU of a user equipment UE type; and the second node is a vehicle-to-everything V2X application server.

According to a second aspect, a communication method is disclosed, including: A second node obtains PC5 broadcast reference information. The PC5 broadcast reference information is used to indicate to send target data in a PC5 interface broadcast mode. The second node sends the PC5 broadcast reference information to a first node.

According to the method provided in this embodiment of this application, the second node indicates, by using the PC5 broadcast reference information, the first node to send the target data from the second node in the PC5 interface broadcast mode. The second node may send the target data to a terminal in an area through the first node, and the first node does not need to sequentially send the target data to each terminal in a one-to-one manner in a PC5 interface unicast mode, but sends the target data in the PC5 interface broadcast mode, thereby saving PC5 bandwidth resources and achieving efficient data delivery.

With reference to the second aspect, in a first example embodiment of the second aspect, the method further includes: The second node sends the target data to the first node.

In this embodiment of this application, the second node may send the target data to the first node, so that the first node sends the target data in the PC5 interface broadcast mode, thereby improving data delivery efficiency.

With reference to the first example embodiment of the second aspect, in a second example embodiment of the second aspect, the method further includes: The second node receives information about the first node. The second node determines, based on the information about the first node, to broadcast the target data through the first node.

In this embodiment of this application, the second node may determine, based on the information about the first node, whether the first node can broadcast the target data, and determine that the first node can broadcast the target data before subsequently sending the target data to the first node, thereby ensuring successful delivery of the data.

With reference to the second example embodiment of the second aspect, in a third example embodiment of the second aspect, the information about the first node includes an identifier of the first node and at least one of: location information of the first node, a service area of the first node, capability information of the first node, or information about a service provided by the first node.

In this embodiment of this application, the second node may more accurately determine, by referring to the location information of the first node, the service area of the first node, the capability information of the first node, or the information about the service provided by the first node, whether the first node can broadcast the target data.

With reference to the second or third example embodiment of the second aspect, in a fourth example embodiment of the second aspect, that the second node determines, based on the information about the first node, to broadcast the target data through the first node includes: The second node determines, based on the information about the first node and information about the target data, to send the target data through the first node. The information about the target data includes at least one of: location information of a third node that receives the target data or an attribute of the target data.

In this embodiment of this application, the second node may more accurately determine, with reference to the information about the first node and the information about the target data, whether the first node can broadcast the target data.

With reference to any one of the second aspect or the first to the fourth example embodiments of the second aspect, in a fifth example embodiment of the second aspect, the broadcast reference information is carried in control signaling.

In this embodiment of this application, the second node sends a PC5 broadcast configuration message once on a control plane, so that the first node can continuously broadcast some data, thereby reducing signaling overheads while achieving efficient data delivery. In addition, if the first node is expected to be switched, provided that control plane signaling is sent to only a switched first node, the target data can be broadcast by the new first node. In addition, the target data can be updated only by changing the target data filtering rule carried in the control signaling. This is more flexible during implementation.

With reference to the fifth example embodiment of the second aspect, in a sixth example embodiment of the second aspect, the PC5 broadcast reference information includes a target data filtering rule. The target data filtering rule is used to filter to obtain the target data.

With reference to the sixth example embodiment of the second aspect, in a seventh example embodiment of the second aspect, the PC5 broadcast reference information further includes a PC5 broadcast indicator and/or target data broadcast frequency information. The PC5 broadcast indicator is used to indicate to send the target data in the PC5 interface broadcast mode. The target data broadcast frequency information is used to indicate a frequency for broadcasting the target data.

In this embodiment of this application, the second node intuitively indicates, by sending the PC5 broadcast indicator, the first node to send the target data in the PC5 interface broadcast mode, and indicates, by using the target data broadcast frequency information, the frequency for broadcasting the target data by the first node, so that the first node can broadcast the target data at a specific frequency, thereby reducing power consumption.

With reference to any one of the second aspect or the first to the fourth example embodiments of the second aspect, in an eighth example embodiment of the second aspect, the target data includes the PC5 broadcast reference information, and the PC5 broadcast reference information includes a PC5 broadcast indicator. The PC5 broadcast indicator is used to indicate to send the target data in the PC5 interface broadcast mode.

In this embodiment of this application, the second node may send the PC5 broadcast reference information to the first node by using the target data, and the second node notifies, on a user plane, the PC5 broadcast reference information, so that a control granularity can be accurate to each data packet, thereby reducing negotiated signaling overheads. In this way, the signaling overheads are reduced while the data is efficiently delivered.

With reference to any one of the second aspect or the first to the eighth example embodiments of the second aspect, in a ninth example embodiment of the second aspect, that the second node sends the target data to the first node includes: The second node sends, on a Uu link, the target data to the first node.

With reference to any one of the second aspect or the first to the ninth example embodiments of the second aspect, in a tenth example embodiment of the second aspect, the first node is a roadside unit RSU of a user equipment UE type; and the second node is a vehicle-to-everything V2X application server.

According to a third aspect, a communications device is disclosed, including: a receiver, configured to receive PC5 broadcast reference information from a second node, where the PC5 broadcast reference information is used to indicate to send target data from the second node in a PC5 interface broadcast mode; and a processor, configured to send the target data in the PC5 interface broadcast mode based on the PC5 broadcast reference information.

With reference to the third aspect, in a first example embodiment of the third aspect, the PC5 broadcast reference information includes a target data filtering rule. The target data filtering rule is used to filter to obtain the target data. The processor is configured to filter data from the second node according to the target data filtering rule, to obtain the target data. The processor is further configured to send the target data in the PC5 interface broadcast mode.

With reference to the first example embodiment of the third aspect, in a second example embodiment of the third aspect, the PC5 broadcast reference information is carried in control signaling.

With reference to the first or second example embodiment of the third aspect, in a third example embodiment of the third aspect, the PC5 broadcast reference information further includes a PC5 broadcast indicator and/or target data broadcast frequency information. The PC5 broadcast indicator is used to indicate to send the target data in the PC5 interface broadcast mode. The target data broadcast frequency information is used to indicate a frequency for broadcasting the target data.

With reference to the third aspect, in a fourth example embodiment of the third aspect, the receiver is further configured to receive the target data from the second node. The target data includes the PC5 broadcast reference information.

With reference to the fourth example embodiment of the third aspect, in a fifth example embodiment of the third aspect, the PC5 broadcast reference information includes a PC5 broadcast indicator. The PC5 broadcast indicator is used to indicate to send the target data in the PC5 interface broadcast mode. The processor is further configured to send the target data in the PC5 interface broadcast mode based on the PC5 broadcast indicator.

With reference to any one of the third aspect or the first to fifth example embodiments of the third aspect, in a sixth example embodiment of the third aspect, the communications device is a roadside unit RSU of a user equipment UE type; and the second node is a vehicle-to-everything V2X application server.

According to a fourth aspect, a communications device is disclosed, including: a processor, configured to obtain PC5 broadcast reference information, where the PC5 broadcast reference information is used to indicate to send target data in a PC5 interface broadcast mode; and a transmitter, configured to send the PC5 broadcast reference information to a first node.

With reference to the fourth aspect, in a first example embodiment of the fourth aspect, the transmitter is further configured to send the target data to the first node.

With reference to the first example embodiment of the fourth aspect, in a second example embodiment of the fourth aspect, the communications device further includes a receiver. The receiver is configured to receive information about the first node. The processor is further configured to determine, based on the information about the first node, to broadcast the target data through the first node.

With reference to the second example embodiment of the fourth aspect, in a third example embodiment of the fourth aspect, the information about the first node includes an identifier of the first node and at least one of: location information of the first node, a service area of the first node, capability information of the first node, or information about a service provided by the first node.

With reference to the second or third example embodiment of the fourth aspect, in a fourth example embodiment of the fourth aspect, the processor is further configured to determine, based on the information about the first node and information about the target data, to send the target data through the first node. The information about the target data includes at least one of: location information of a third node that receives the target data or an attribute of the target data.

With reference to any one of the fourth aspect or the first to fourth example embodiments of the fourth aspect, in a fifth example embodiment of the fourth aspect, the PC5 broadcast reference information is carried in control signaling.

With reference to the fifth example embodiment of the fourth aspect, in a sixth example embodiment of the fourth aspect, the PC5 broadcast reference information includes a target data filtering rule. The target data filtering rule is used to filter to obtain the target data.

With reference to the sixth example embodiment of the fourth aspect, in a seventh example embodiment of the fourth aspect, the PC5 broadcast reference information further includes a PC5 broadcast indicator and/or target data broadcast frequency information. The PC5 broadcast indicator is used to indicate to send the target data in the PC5 interface broadcast mode. The target data broadcast frequency information is used to indicate a frequency for broadcasting the target data.

With reference to any one of the fourth aspect or the first to seventh example embodiments of the fourth aspect, in an eighth example embodiment of the fourth aspect, the target data includes the PC5 broadcast reference information, and the PC5 broadcast reference information includes a PC5 broadcast indicator. The PC5 broadcast indicator is used to indicate to send the target data in the PC5 interface broadcast mode.

With reference to any one of the fourth aspect or the first to eighth example embodiments of the fourth aspect, in a ninth example embodiment of the fourth aspect, the transmitter is further configured to send, on a Uu link, the target data to the first node.

With reference to any one of the fourth aspect or the first to ninth example embodiments of the fourth aspect, in a tenth example embodiment of the fourth aspect, the first node is a roadside unit RSU of a user equipment UE type; and the communications device is a vehicle-to-everything V2X application server.

According to a fifth aspect, a communication method is disclosed, including: A first node receives a first request from a second node. The first request is used to request to send target data from the second node in a PC5 interface broadcast mode. Further, the first node allocates a filtering rule based on the first request. The filtering rule is used to filter the target data sent by the second node. The first node may further send a response to the first request to the second node. The response to the first request includes the filtering rule.

In this embodiment of this application, to improve data delivery efficiency, the second node requests the first node to send the target data in the PC5 interface broadcast mode, the first node provides the second node with a filtering rule used to filter the target data, and the second node may determine the target data according to the filtering rule. In this manner, the second node may send the target data to the first node, and the first node may also identify the target data from the second node according to the filtering rule, so that the first node can send the target data in the PC5 interface broadcast mode. It can be learned that in this embodiment of this application, the first node does not need to sequentially send the target data to each terminal in a one-to-one manner in a PC5 interface unicast mode, but sends the target data in the PC5 interface broadcast mode, thereby saving PC5 bandwidth resources and efficiently delivering the data.

With reference to the fifth aspect, in a first example embodiment of the fifth aspect, the method further includes: The first node filters received data according to the filtering rule, to obtain the target data from the second node. Further, the first node may send the target data in the PC5 interface broadcast mode.

In this embodiment of this application, the first node may obtain the target data through filtering according to the filtering rule, to send the target data in the PC5 interface broadcast mode, thereby greatly improving the data delivery efficiency.

With reference to the fifth aspect or the first example embodiment of the fifth aspect, in a second example embodiment of the fifth aspect, the filtering rule includes a port number of the first node.

In this embodiment of this application, the first node may identify the target data from the received data based on the port number, and then send the target data in the PC5 interface broadcast mode, thereby greatly improving the data delivery efficiency.

With reference to the first or second example embodiment of the fifth aspect, in a third example embodiment of the fifth aspect, that the first node sends the target data in the PC5 interface broadcast mode includes: The first node allocates a target protocol layer address to the target data. The target protocol layer address is used to send the target data at a target protocol layer in the PC5 interface broadcast mode. The first node sends the target data in the PC5 interface broadcast mode based on the target protocol layer address.

In this embodiment of this application, the first node allocates the target protocol layer address to the target data, to ensure that the target data is broadcast on a PC5 interface.

With reference to the third example embodiment of the fifth aspect, in a fourth example embodiment of the fifth aspect, the response to the first request further includes the target protocol layer address.

In this embodiment of this application, the first node may further send the target protocol layer address to the second node by using the response to the first request, so that the second node sends the target protocol layer address to a third node, and the third node identifies, based on the target protocol layer address, that the first node sends the target data in the PC5 interface broadcast mode.

According to a sixth aspect, a communication method is disclosed, including:

A second node sends a first request to a first node. The first request is used to request to send target data from the second node in a PC5 interface broadcast mode. The second node receives a response to the first request from the first node. The response to the first request includes a filtering rule. The filtering rule is used to filter the target data sent by the second node.

With reference to the sixth aspect, in a first example embodiment of the sixth aspect, the method further includes: The second node sends the target data to the first node according to the filtering rule.

With reference to the sixth aspect or the first example embodiment of the sixth aspect, in a second example embodiment of the sixth aspect, the filtering rule includes a port number of the first node.

With reference to the sixth aspect or the first or second example embodiment of the sixth aspect, in a third example embodiment of the sixth aspect, the response to the first request further includes a target protocol layer address. The target protocol layer address is used to send the target data at a target protocol layer in the PC5 interface broadcast mode. In addition, the method further includes: The second node sends the target protocol layer address to a third node.

According to a seventh aspect, a communications device is disclosed, including: a receiver, configured to receive a first request from a second node, where the first request is used to request to send target data from the second node in a PC5 interface broadcast mode; a processor, configured to allocate a filtering rule based on the first request, where the filtering rule is used to filter the target data sent by the second node; and a transmitter, configured to send a response to the first request to the second node, where the response to the first request includes the filtering rule.

With reference to the seventh aspect, in a first example embodiment of the seventh aspect, the processor is further configured to filter received data according to the filtering rule to obtain the target data from the second node. The processor is further configured to send the target data in the PC5 interface broadcast mode.

With reference to the seventh aspect or the first example embodiment of the seventh aspect, in a second example embodiment of the seventh aspect, the filtering rule includes a port number of the first node.

With reference to the first or second example embodiment of the seventh aspect, in a third example embodiment of the seventh aspect, the processor is further configured to allocate a target protocol layer address to the target data. The target protocol layer address is used to send the target data at a target protocol layer in the PC5 interface broadcast mode. The processor is further configured to send the target data in the PC5 interface broadcast mode based on the target protocol layer address.

With reference to the third example embodiment of the seventh aspect, in a fourth example embodiment of the seventh aspect, the response to the first request further includes the target protocol layer address.

According to an eighth aspect, a communications device is disclosed, including: a transmitter, configured to send a first request to a first node, where the first request is used to request to send target data from a second node in a PC5 interface broadcast mode; and a receiver, configured to receive a response to the first request from the first node, where the response to the first request includes a filtering rule, and the filtering rule is used to filter the target data sent by the second node.

With reference to the eighth aspect, in a first example embodiment of the eighth aspect, the processor is further configured to send the target data to the first node according to the filtering rule.

With reference to the eighth aspect or the first example embodiment of the eighth aspect, in a second example embodiment of the eighth aspect, the filtering rule includes a port number of the first node.

With reference to the eighth aspect or the first or second example embodiment of the eighth aspect, in a third example embodiment of the eighth aspect, the response to the first request further includes a target protocol layer address. The target protocol layer address is used to send the target data at a target protocol layer in the PC5 interface broadcast mode. In addition, the transmitter is further configured to send the target protocol layer address to a third node.

According to a ninth aspect, a communications device is disclosed, including: a communications interface, configured to receive PC5 broadcast reference information from a second node, where the PC5 broadcast reference information is used to indicate to send target data from the second node in a PC5 interface broadcast mode; and a processor, configured to send the target data in the PC5 interface broadcast mode based on the PC5 broadcast reference information through a transmitter.

With reference to the ninth aspect, in a first example embodiment of the ninth aspect, the PC5 broadcast reference information includes a target data filtering rule. The target data filtering rule is used to filter to obtain the target data. The processor is further configured to filter data from the second node according to the target data filtering rule, to obtain the target data. The processor is further configured to send the target data in the PC5 interface broadcast mode through the transmitter.

With reference to the first example embodiment of the ninth aspect, in a second example embodiment of the ninth aspect, the PC5 broadcast reference information is carried in control signaling.

With reference to the first or second example embodiment of the ninth aspect, in a third example embodiment of the ninth aspect, the PC5 broadcast reference information further includes a PC5 broadcast indicator and/or target data broadcast frequency information. The PC5 broadcast indicator is used to indicate to send the target data in the PC5 interface broadcast mode. The target data broadcast frequency information is used to indicate a frequency for broadcasting the target data.

With reference to the ninth aspect, in a fourth example embodiment of the ninth aspect, the communications interface is further configured to receive the target data from the second node. The target data includes the PC5 broadcast reference information.

With reference to the fourth example embodiment of the ninth aspect, in a fifth example embodiment of the ninth aspect, the PC5 broadcast reference information includes a PC5 broadcast indicator. The PC5 broadcast indicator is used to indicate to send the target data in the PC5 interface broadcast mode. The processor is further configured to send the target data in the PC5 interface broadcast mode based on the PC5 broadcast indicator through the transmitter.

With reference to any one of the ninth aspect or the first to fifth example embodiments of the ninth aspect, in a sixth example embodiment of the ninth aspect, the communications device is a roadside unit RSU of a user equipment UE type; and the second node is a vehicle-to-everything V2X application server.

According to a tenth aspect, a communications device is disclosed, including: a processor, configured to obtain PC5 broadcast reference information, where the PC5 broadcast reference information is used to indicate to send target data in a PC5 interface broadcast mode; and a communications interface, configured to send the PC5 broadcast reference information to a first node.

With reference to the tenth aspect, in a first example embodiment of the tenth aspect, the communications interface is further configured to send the target data to the first node.

With reference to the first example embodiment of the tenth aspect, in a second example embodiment of the tenth aspect, the communications interface is configured to receive information about the first node. The processor is further configured to determine, based on the information about the first node, to broadcast the target data through the first node.

With reference to the second example embodiment of the tenth aspect, in a third example embodiment of the tenth aspect, the information about the first node includes an identifier of the first node and at least one of: location information of the first node, a service area of the first node, capability information of the first node, or information about a service provided by the first node.

With reference to the second or third example embodiment of the tenth aspect, in a fourth example embodiment of the tenth aspect, the processor is further configured to determine, based on the information about the first node and information about the target data, to send the target data through the first node. The information about the target data includes at least one of: location information of a third node that receives the target data or an attribute of the target data.

With reference to any one of the tenth aspect or the first to fourth example embodiments of the tenth aspect, in a fifth example embodiment of the tenth aspect, the PC5 broadcast reference information is carried in control signaling.

With reference to the fifth example embodiment of the tenth aspect, in a sixth example embodiment of the tenth aspect, the PC5 broadcast reference information includes a target data filtering rule. The target data filtering rule is used to filter to obtain the target data.

With reference to the sixth example embodiment of the tenth aspect, in a seventh example embodiment of the tenth aspect, the PC5 broadcast reference information further includes a PC5 broadcast indicator and/or target data broadcast frequency information. The PC5 broadcast indicator is used to indicate to send the target data in the PC5 interface broadcast mode. The target data broadcast frequency information is used to indicate a frequency for broadcasting the target data.

With reference to any one of the tenth aspect or the first to seventh example embodiments of the tenth aspect, in an eighth example embodiment of the tenth aspect, the target data includes the PC5 broadcast reference information, and the PC5 broadcast reference information includes a PC5 broadcast indicator. The PC5 broadcast indicator is used to indicate to send the target data in the PC5 interface broadcast mode.

With reference to any one of the tenth aspect or the first to eighth example embodiments of the tenth aspect, in a ninth example embodiment of the tenth aspect, the communications interface further configured to send, on a Uu link, the target data to the first node.

With reference to any one of the tenth aspect or the first to ninth example embodiments of the tenth aspect, in a tenth example embodiment of the tenth aspect, the first node is a roadside unit RSU of a user equipment UE type; and the communications device is a vehicle-to-everything V2X application server.

According to an eleventh aspect, a communications device is disclosed, including: a communications interface, configured to receive a first request from a second node, where the first request is used to request to send target data from the second node in a PC5 interface broadcast mode; and a processor, configured to allocate a filtering rule based on the first request, where the filtering rule is used to filter the target data sent by the second node. The communications interface is further configured to send a response to the first request to the second node, where the response to the first request includes the filtering rule.

With reference to the eleventh aspect, in a first example embodiment of the eleventh aspect, the processor is further configured to filter received data according to the filtering rule to obtain target data from the second node. The processor is further configured to send the target data in the PC5 interface broadcast mode through a transmitter.

With reference to the eleventh aspect or the first example embodiment of the eleventh aspect, in a second example embodiment of the eleventh aspect, the filtering rule includes a port number of the first node.

With reference to the first or second example embodiment of the eleventh aspect, in a third example embodiment of the eleventh aspect, the communications device further includes the transmitter. The processor is further configured to allocate a target protocol layer address to the target data. The target protocol layer address is used to send the target data at a target protocol layer in the PC5 interface broadcast mode. The processor is further configured to send the target data in the PC5 interface broadcast mode based on the target protocol layer address through the transmitter.

With reference to the third example embodiment of the eleventh aspect, in a fourth example embodiment of the eleventh aspect, the response to the first request further includes the target protocol layer address.

According to a twelfth aspect, a communications device is disclosed, including: a communications interface, configured to send a first request to a first node, where the first request is used to request to send target data from a second node in a PC5 interface broadcast mode. The communications interface is further configured to receive a response to the first request from the first node. The response to the first request includes a filtering rule. The filtering rule is used to filter the target data sent by the second node.

With reference to the twelfth aspect, in a first example embodiment of the twelfth aspect, the communications device further includes: a processor, configured to send the target data to the first node according to the filtering rule through the communications interface.

With reference to the twelfth aspect or the first example embodiment of the twelfth aspect, in a second example embodiment of the twelfth aspect, the filtering rule includes a port number of the first node.

With reference to the twelfth aspect or the first or second example embodiment of the twelfth aspect, in a third example embodiment of the twelfth aspect, the response to the first request further includes a target protocol layer address. The target protocol layer address is used to send the target data at a target protocol layer in the PC5 interface broadcast mode. In addition, the communications interface is further configured to send the target protocol layer address to a third node.

According to a thirteenth aspect, a computer-readable storage medium is disclosed, where: the computer-readable storage medium stores instructions. The instructions are used to perform the communication methods in the foregoing aspects.

According to a fourteenth aspect, a chip system is provided. The chip system includes a processor and a communications interface, and is configured to support a communications device in implementing the communication methods in the foregoing aspects. In an example embodiment, the chip system further includes a memory. The memory is configured to store program instructions and data that are necessary for the communications device. The chip system may include a chip, or may include a chip and another discrete component.

DESCRIPTION OF EMBODIMENTS

The following describes example technical solutions of this application with reference to the accompanying drawings.

A method provided in the embodiments of this application may be applied to any communications system that supports V2X message transmission. The communications system may be a 3rd generation partnership project (3GPP) communications system, for example, a long term evolution (LTE) system, or may be a 5th generation (5G) mobile communications system or a new radio (NR) system, or may be a non-3GPP communications system. This is not limited in the embodiments of this application.

Figure 1:
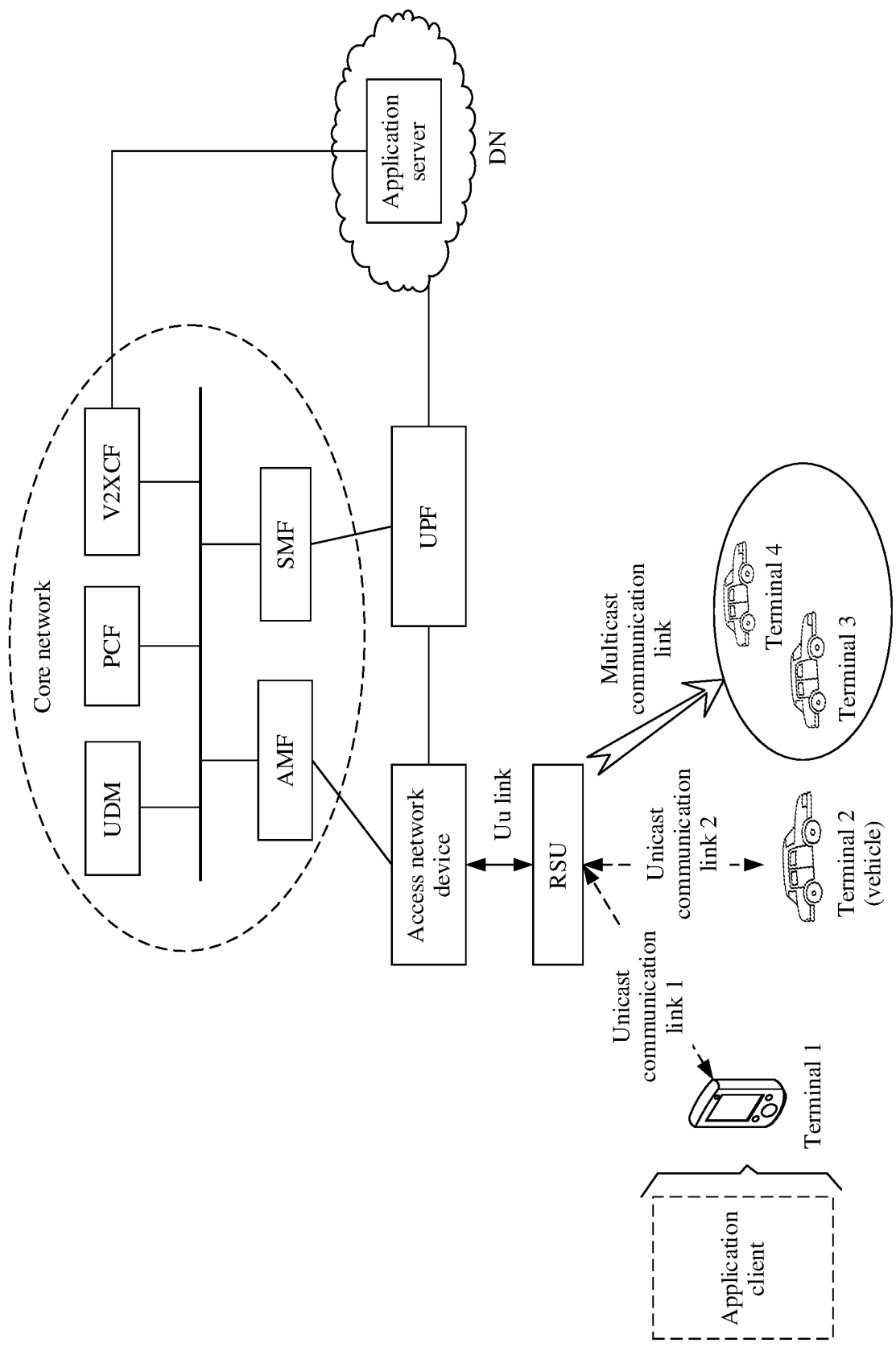
FIG. 1 is a diagram of an architecture of an example communications system.

FIG. 1 is a diagram of an architecture of an example communications system. The communications system supports V2X message transmission. As shown in FIG. 1, the communications system may include a plurality of terminals, an access network device, an access and mobility management function (AMF) entity, a V2X control function (V2XCF) entity, a policy control function (PCF) entity, a unified data management (UDM) entity, a session management function (SMF) entity, a user plane function (UPF) entity, a data network (DN), a roadside unit (RSU), and the like. The DN may include an application server (APP server).

The application server may be an entity responsible for processing application layer service logic, for example, a V2X application server, an internet of things (IoT) application server, a public safety service application server, an unmanned aerial vehicle server (for example, an unmanned aerial vehicle supervision enabler server or an unmanned aerial vehicle application service server), or a V2X application enabler (VAE) server.

A terminal may be referred to as user equipment (UE) or a terminal device, and may support V2X communication, for example, receiving or sending a V2X message. The V2X message may include but is not limited to a V2V message, a V2P message, a V2N message, V2I information, an anti-collision message between vehicles, an entertainment application message, a navigation message exchanged between vehicles, and the like. The terminal in the embodiments of this application may include but is not limited to a vehicle-mounted terminal, a mobile phone, a tablet computer, a computer having a wireless transceiver function, a smart gas station, a smart signal light, and the like. Refer to FIG. 1. The terminal may further include an application client corresponding to the application server. The application client is a logical functional unit peer to the application server. For example, the application client is a V2X application client corresponding to the V2X application server, a VAE client corresponding to the VAE server, an IoT application client corresponding to the IoT application server, a public safety service application client corresponding to the public safety service application server, or an unmanned aerial vehicle client corresponding to the unmanned aerial vehicle server. Specifically, the application client is an application program on the terminal, and may be implemented by hardware or software.

The RSU may be a UE-type RSU (UE type RSU). As shown in FIG. 1, the RSU receives data from the application server, and sends the received data to the terminal through a PC5 interface between the RSU and the terminal. The PC5 interface may be a sidelink interface, and may be used for direct communication between terminals in the communications system shown in FIG. 1, or may be used for communication between a terminal and some communications devices. For example, the terminal may communicate with the RSU through the PC5 interface.

In an example implementation, the RSU sends data in a PC5 interface unicast mode. The PC5 interface unicast mode is a one-to-one mode of communication performed on the PC5 interface. For example, a transmit end and a receive end establish a unicast communication link on the PC5 interface, and receive and send data on the unicast communication link. For example, referring to FIG. 1, the RSU establishes a unicast communication link 1 to a terminal 1, and the RSU sends data to the terminal 1 on the unicast communication link 1. The RSU establishes a unicast communication link 2 to a terminal 2, and the RSU sends data to the terminal 2 on the unicast communication link 2.

In another example implementation, the RSU sends data in a PC5 interface broadcast mode. The PC5 interface broadcast mode is a one-to-many mode of communication performed on the PC5 interface. For example, a transmit end does not need to separately send data to each receive end in a one-to-one manner, but sends data on a multicast communication link of the PC5 interface. Any receive end within a PC5 broadcast communication range can receive the data broadcast by the transmit end. For example, referring to FIG. 1, the RSU establishes multicast communication links to a terminal 3 and a terminal 4, and the RSU sends data to the terminal 3 and the terminal 4 on the multicast communication links.

It should be noted that the network architecture shown in FIG. 1 is merely an example architecture, but a quantity of network elements included in the communications system shown in FIG. 1 is not limited in embodiments of the present disclosure. In addition to the network functional entities shown in FIG. 1, a network shown in FIG. 1 may further include another functional entity, although the another functional entity is not shown in FIG. 1. In addition, names of network elements and names of interfaces between the network elements in the network architecture shown in FIG. 1 are merely examples. During specific implementation, the names of the network elements and the names of the interfaces between the network elements may be other names. This is not specifically limited in the embodiments of this application. In addition, the method provided in this embodiment of this application may be applied to the communications system shown in FIG. 1. The method provided in this embodiment of this application may also be applied to another network or system that supports V2X message transmission. This is not limited in the embodiments of this application.

Figure 2:
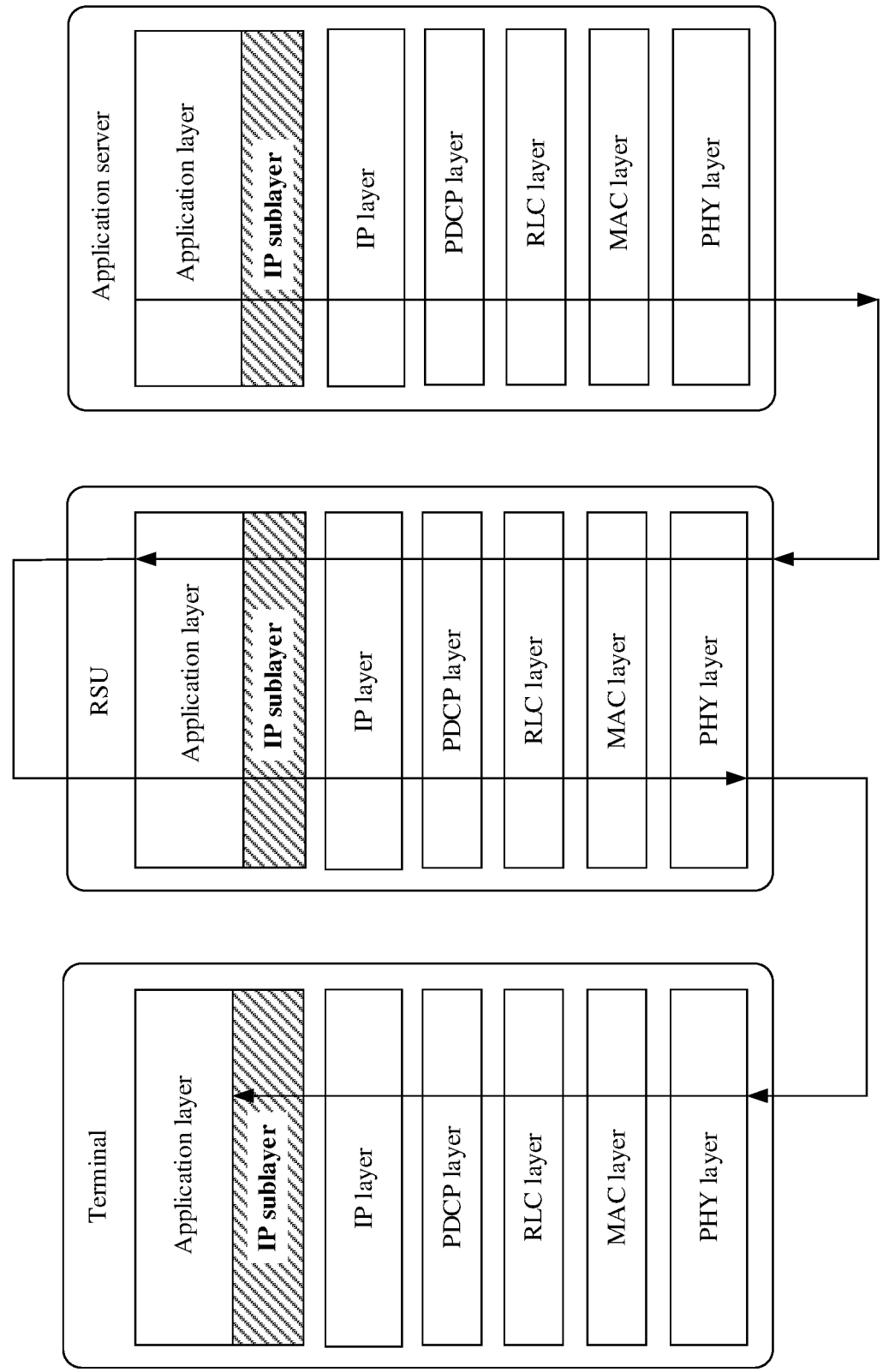
FIG. 2 is a schematic diagram of a protocol stack.

In an example embodiment, the terminal, the RSU, and the application server may establish a protocol layer shown in FIG. 2. The terminal, the RSU, and the application server may interact with each other at the protocol layer shown in FIG. 2. In FIG. 2, protocol stacks of an application server, a terminal, and an RSU each include an application layer, an internet protocol (IP) layer, a packet data convergence protocol (PDCP) layer, a radio link control (RLC) layer, a media access control (MAC) layer, and a physical layer (PHY layer).

The application layer is mainly used to process application layer service logic of an application service, for example, generate a V2X message, share a collected video, generate an instant message, or share a high-definition map. Functions of the IP layer, the PDCP layer, the RLC layer, the MAC layer, and the PHY layer are the same as functions of an IP layer, a PDCP layer, an RLC layer, a MAC layer, and a PHY layer in a conventional technology.

As shown in FIG. 2, an IP sublayer may be further added to respective protocol stacks of the terminal, the RSU, and the application server. The IP sublayer is similar to an existing IP tunnel. A function of the IP sublayer is the same as a corresponding function of an IP tunnel in the conventional technology.

Figure 3:
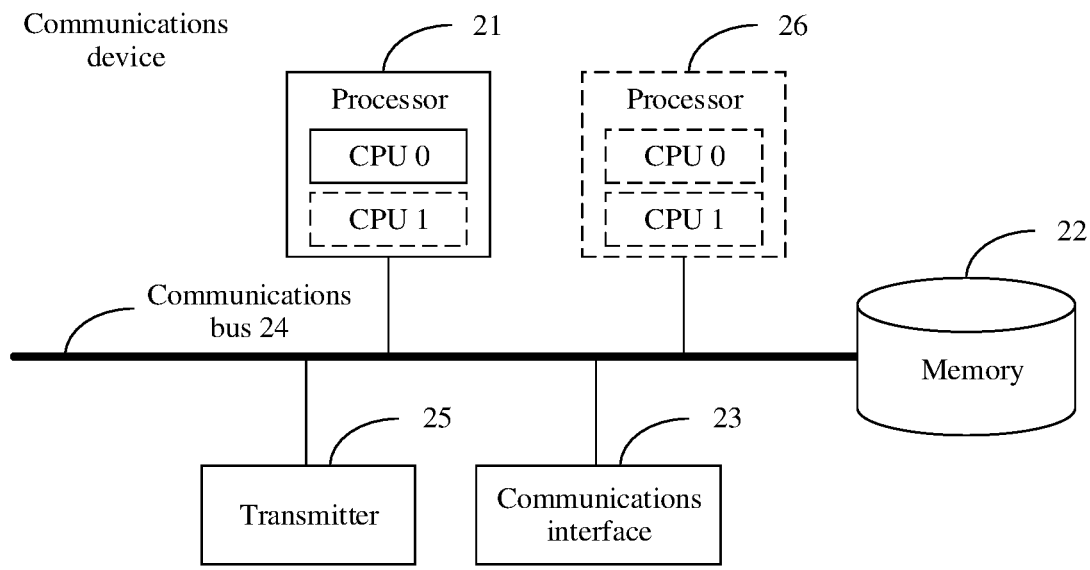
FIG. 3 is a schematic composition diagram of a communications device according to an embodiment of this application.

FIG. 3 is a schematic composition diagram of a communications device according to an embodiment of this application. The communications device may be a first node in the embodiments of this application, for example, the RSU in the communications system shown in FIG. 1. As shown in FIG. 3, the communications device may include at least one processor 21, a memory 22, a communications interface 23, a communications bus 24, and a transmitter 25. The following describes components of the communications device in detail with reference to FIG. 3.

The processor 21 may be one processor or may be a general term of a plurality of processing elements. In addition, the processor 21 may be a central processing unit (CPU), or may be an application-specific integrated circuit (ASIC), or may be configured as one or more integrated circuits for implementing the embodiments of this application, for example, one or more digital signal processors (DSP) or one or more field programmable gate arrays (FPGA).

The processor 21 may run or execute a program stored in the memory 22, to perform steps described in the embodiments of this application. When the communications device is an RSU, the processor 21 may run or execute the program stored in the memory 22, to perform actions or steps of the first node in method embodiments of this application. Alternatively, when the communications device is a V2X application server, the processor 21 may run or execute the program stored in the memory 22, to perform actions or steps of a second node in method embodiments of this application.

In an example implementation, the communications device may include a plurality of processors, for example, the processor 21 and a processor 26 shown in FIG. 3. Each of these processors may be a single-core processor (single-CPU), or may be a multi-core processor (multi-CPU). The processor herein may be one or more devices, circuits, and/or processing cores for processing data (for example, computer program instructions).

In an implementation, one processor (for example, the processor 21 or the processor 26) of the communications device may include one or more CPUs, for example, a CPU 0 and a CPU 1 shown in FIG. 3.

The memory 22 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that is accessible by a computer, but is not limited thereto. The memory 22 may exist independently, and is connected to the processor 21 through the communications bus 24. Alternatively, the memory 22 may be integrated with the processor 21. The memory 22 is configured to store a software program for performing the solutions of this application, and the processor 21 controls the execution.

The communications interface 23 is configured to support communication between an RSU and a V2X application server. For example, the RSU is connected to the V2X application server in a wired manner. The RSU may send data to the V2X application server through the communications interface 23, or may receive, through the communications interface 23, data sent by the V2X application server.

In addition, the transmitter 25 is configured to support communication between the RSU and a terminal. For example, the RSU broadcasts data through the transmitter 25, and the terminal may receive the data broadcast by the RSU through the transmitter 25.

The communications bus 24 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 3, but this does not mean that there is only one bus or only one type of bus.

It should be noted that the components shown in FIG. 3 do not constitute a limitation on the communications device. In addition to the components shown in FIG. 3, the communications device may include more or fewer components than those shown in the figure, or some components may be combined, or different component arrangements may be used.

Figure 4:
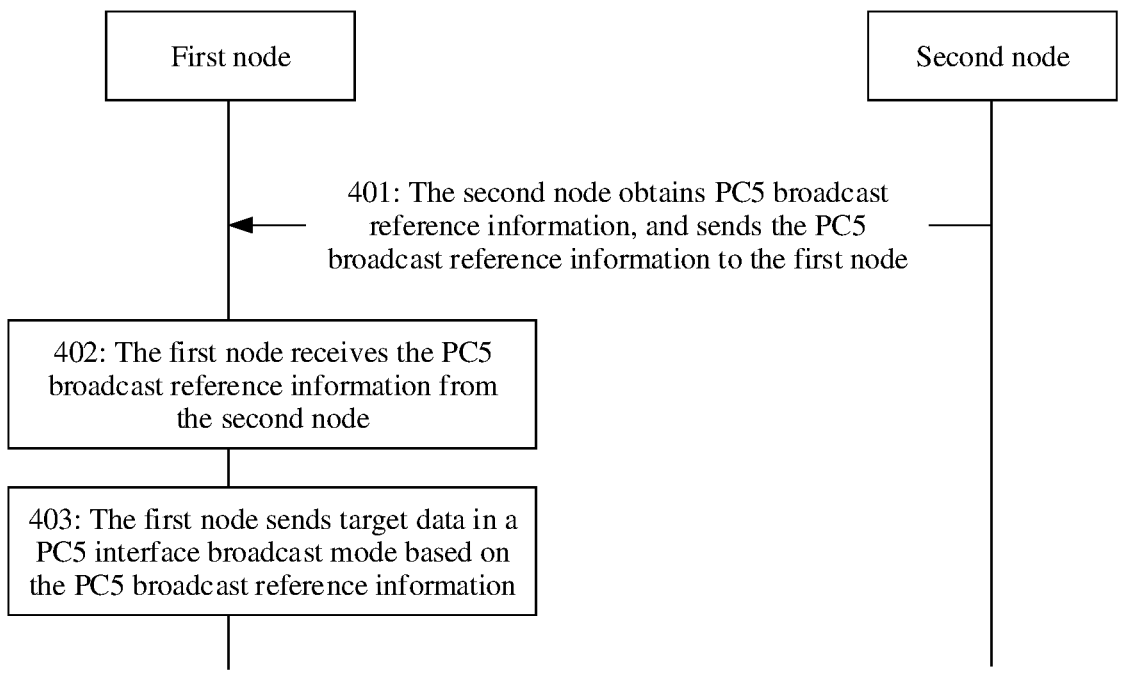
FIG. 4 is a schematic flowchart of a communication method according to an embodiment of this application.

An embodiment of this application provides a communication method. The method may be applied to the communications system shown in FIG. 1. As shown in FIG. 4, the method includes the following steps.

401: A second node obtains PC5 broadcast reference information, and sends the PC5 broadcast reference information to a first node.

The PC5 broadcast reference information is used to indicate to send target data in a PC5 interface broadcast mode.

The second node may be a server that needs to transmit data. For example, the second node may be the application server in the communications system shown in FIG. 1. The first node may be a communications device having a data routing function. For example, the first node is the RSU in the communications system shown in FIG. 1, and may be specifically a UE-type RSU (UE type RSU). In addition, the first node may also be the application client in the terminal shown in FIG. 1.

The target data may be data sent in the PC5 interface broadcast mode, for example, may be data sent by the second node to a terminal in an area. In addition, the target data may be an application message such as a V2X message or a real-time transport protocol (RTP) message. For example, the target data may be one or more V2X messages.

Specifically, the second node may send the PC5 broadcast reference information to the first node in the following two possible manners which include:

In a first manner, the second node sends, on a control plane, the PC5 broadcast reference information to the first node.

Specifically, the second node may include the PC5 broadcast reference information in control signaling, and send the control signaling to the first node. There may be one or more pieces of control signaling, and this is not limited in embodiments of the present disclosure. In this implementation, the PC5 broadcast reference information may include a target data filtering rule, and the target data filtering rule is used to filter to obtain the target data, that is, the target data may be identified or selected according to the target data filtering rule.

The target data filtering rule may be a feature (or an attribute) of data sent in the PC5 interface broadcast mode, and then the target data may be obtained through filtering based on data of the feature (or attribute).

Specifically, the feature of the data may be one or more of a source address of the data, a destination address of the data, a type of the data, and an application service identifier of the data.

The source address of the data may be a source IP address and/or a source port number, and the source address of the data may alternatively be a source address of another protocol type, for example, a source MAC address.

The destination address of the data may be an address at which the data finally arrives or a next-hop address of the data. For example, the destination address of the data is a destination IP address of the data and/or a destination port number of the data. The destination address of the data may alternatively be an address of another protocol type, and for example, the destination address of the data is a destination MAC address.

The type of the data may be a V2X message, a V2V message, a V2N message, a V2I message, a V2P message, IP data, non-IP data, or the like. It is clear that the type of the data may alternatively be a specific V2V message type, for example, a cooperative awareness message (CAM), or a decentralized environmental notification message (DENM). This is not limited in embodiments of the present disclosure.

The application service identifier of the data is used to identify an application or a service to which the data belongs, for example, a V2X service identifier, a provider service identifier (PSID), an intelligent transportation system application identifier (ITS-AID), an application identifier (App-ID), or an application server identifier (for example, a domain name or an IP address). The application service identifier of the data may alternatively be an application layer session identifier, and for example, the service identifier of the data is a session initiation protocol (SIP) session identifier.

In a second manner, the second node sends, on a user plane, the PC5 broadcast reference information to the first node.

Specifically, the target data may include the PC5 broadcast reference information, and the second node may include the PC5 broadcast reference information in the target data and send the target data to the first node.

In this implementation, the PC5 broadcast reference information may include a PC5 broadcast indicator. The PC5 broadcast indicator may be used to indicate to send the target data in the PC5 interface broadcast mode.

Usually, data may include a header and a payload. The header of the data includes many indication fields, and a payload part of the data may include a video, a voice, and the like. During specific implementation of this application, the PC5 broadcast indicator may be carried in a header of the target data. For example, an existing indication field in the header of the data may be reused as the PC5 broadcast indicator, or an indication field may be added as the PC5 broadcast indicator to the header of the data.

For example, the target data is a V2X message. It is assumed that a header of the V2X message includes the PC5 broadcast reference information and the PC5 broadcast reference information includes the PC5 broadcast indicator. In this case, the V2X message is sent in the PC5 interface broadcast mode. Alternatively, it is assumed that a plurality of V2X messages are encapsulated in one data packet, a header of the data packet includes the PC5 broadcast reference information, and the PC5 broadcast reference information includes the PC5 broadcast indicator. In this case, all V2X messages encapsulated in the data packet are separately sent in the PC5 interface broadcast mode.

It should be noted that the second node may send, on a Uu link, the target data to the first node. For example, when the first node is an RSU, and the second node is an application server, referring to FIG. 1, the application server sends the target data to the UPF, and the UPF receives the target data from the application server and sends the target data to the access network device. The access network device receives the target data from the UPF, and the access network device sends, on a Uu link between the access network device and the RSU, the target data to the RSU.

402: The first node receives the PC5 broadcast reference information from the second node.

Optionally, when the second node sends the PC5 broadcast reference information to the first node in the first manner in step 401, the first node receives control signaling from the second node, where the control signaling includes the PC5 broadcast reference information. The PC5 broadcast reference information may include a target data filtering rule. After receiving the control signaling from the second node, the first node may obtain the target data filtering rule.

It should be noted that "filtering" in the embodiments of this application may be understood as identification or selection. This is not limited in embodiments of the present disclosure.

Optionally, when the second node sends the PC5 broadcast reference information to the first node in the second manner in step 401, the first node receives the target data from the second node, where a header of the target data includes the PC5 broadcast reference information. The PC5 broadcast reference information includes a PC5 broadcast indicator. After receiving the target data from the second node, the first node may obtain the PC5 broadcast indicator.

403: The first node sends the target data in the PC5 interface broadcast mode based on the PC5 broadcast reference information.

Optionally, when the second node sends the PC5 broadcast reference information to the first node in the first manner in step 401, before the first node sends the target data in step 403, the foregoing method may further include: The second node sends data to the first node. Correspondingly, the first node receives the data sent by the second node.

For example, step 403 may include: The first node filters the data from the second node according to the target data filtering rule in the PC5 broadcast reference information to obtain the target data, and sends the target data in the PC5 interface broadcast mode.

A V2X message is used as an example. Before step 403, the first node receives the V2X message from the second node. In step 403, the first node filters the received V2X message according to the target data filtering rule to obtain a V2X message that meets the target data filtering rule, and sends, in the PC5 interface broadcast mode, the V2X message obtained through filtering.

The target data filtering rule may be a V2X message whose source port number is 100. The first node determines, in the received V2X message, the V2X message whose source port number is 100 as the target data. Alternatively, the target data filtering rule may be a V2X message of a CAM type. The first node determines, in the received V2X message, a CAM message as the target data.

Optionally, based on the second example embodiment in step 401, the method further includes: The second node sends the target data to the first node. The target data includes the PC5 broadcast reference information, and the PC5 broadcast reference information includes the PC5 broadcast indicator.

Correspondingly, in step 402, the first node receives the target data from the second node. In this case, step 403 may include: The first node sends, based on the PC5 broadcast indicator, in the PC5 interface broadcast mode, the target data received in step 402.

For example, the target data is a V2X message. The first node receives the V2X message from the second node in step 402, where the V2X message includes the PC5 broadcast indicator. In this case, the first node sends the V2X message in the PC5 interface broadcast mode. Alternatively, the first node receives a data packet from the second node in step 402. The first node parses out the PC5 broadcast indicator from a packet header of the data packet, and parses out a plurality of V2X messages from a payload of the data packet. In this case, the first node sends the plurality of parsed out V2X messages in the PC5 interface broadcast mode.

According to the method provided in this embodiment of this application, the second node indicates, by using the PC5 broadcast reference information, the first node to send the target data from the second node in the PC5 interface broadcast mode. The second node may send the target data to a terminal in an area through the first node, and the first node does not need to sequentially send the target data to each terminal in a one-to-one manner in a PC5 interface unicast mode, but sends the target data in the PC5 interface broadcast mode, thereby saving PC5 bandwidth resources and achieving efficient data delivery.

Optionally, in a first implementation scenario of the embodiment corresponding to FIG. 4, in this implementation scenario, the second node sends the PC5 broadcast reference information to the first node through control signaling, where the PC5 broadcast reference information may further include a PC5 broadcast indicator and/or target data broadcast frequency information.

For the PC5 broadcast indicator, refer to the foregoing related descriptions. Details are not repeated. Correspondingly, the PC5 broadcast indicator may be used to explicitly indicate the first node to send, in the PC5 interface broadcast mode, the target data obtained according to the target data filtering rule. The PC5 broadcast indicator explicitly indicates the first node to broadcast data through a PC5 interface, so that the first node more intuitively determines to send, in the PC5 interface broadcast mode, the target data obtained through filtering according to the target data filtering rule.

The target data broadcast frequency information may be used to indicate a frequency used to broadcast the target data. For example, the target data broadcast frequency information may indicate a quantity of times of broadcasting the target data, for example, broadcasting the target data 10 times. Alternatively, the target data broadcast frequency information may indicate a quantity of times of broadcasting the target data within a unit granularity. The unit granularity may be a unit time length, for example, 10 times/s, that is, the target data is broadcast 10 times per second. Correspondingly, the first node broadcasts the target data based on the frequency indicated by the target data broadcast frequency information, so that signaling overheads of the first node are reduced, and power consumption of the first node is reduced.

Optionally, in a second implementation scenario of the embodiment corresponding to FIG. 4, in this implementation scenario, the second node sends, on a user plane, the PC5 broadcast reference information to the first node, where the PC5 broadcast reference information may further include the target data broadcast frequency information.

Optionally, in a third implementation scenario of the embodiment corresponding to FIG. 4, before step 401, the method further includes: The second node receives information about the first node, and determines, based on the information about the first node, to broadcast the target data through the first node.

The information about the first node may include an identifier of the first node and at least one of: location information of the first node, service area information of the first node, capability information of the first node, or information about a service provided by the first node.

The location information of the first node may be used to indicate a location of the first node. For example, the location information of the first node may be geographical location information of the first node, or may be network address information of the first node. The network address information of the first node may be a cell identifier of a cell accessed by the first node, an identifier of a base station accessed by the first node, a tracking area (TA) corresponding to the first node, or an identifier of an access and mobility management function (AMF) network element that provides a service for the first node. This is not limited in embodiments of the present disclosure.

The service area information of the first node may be information about an area in which the first node provides a service, where for example, the service area information of the first node may include identifiers of one or more cells, or identifiers of one or more TAs; or may be information about a geographical location area, for example, coordinate information of a service area.

The capability information of the first node may be used to indicate a communication capability of the first node, for example, a communication mode (for example, PC5 short-range communication) supported by the first node, a message format supported by the first node, a quantity of connections supported by the first node, or a bandwidth supported by the first node.

Optionally, in a fourth implementation scenario of the embodiment corresponding to FIG. 4, the second node receives information about the first node by using a registration request sent by the first node.

Specifically, the registration request sent by the first node to the second node may include the information about the first node. The second node may alternatively store the information about the first node locally, and send a registration response to the first node, to indicate that the first node is successfully registered.

For example, a communications device (including the first node) having an RSU function in a communications system may send a register request to the second node, to request to register the communications device on the second node. The registration request may include information about the communications device, for example, an identifier of the communications device, location information of the communications device, capability information of the communications device, a service area of the communications device, or information about a service that can be provided by the communications device. For details, refer to the foregoing related descriptions. Details are not repeated herein. The second node may store the information in the registration request locally, and reply with a registration response to the communications device.

Optionally, in a fifth implementation scenario of the embodiment corresponding to FIG. 4, the determining, based on the information about the first node, to broadcast the target data through the first node may include: The second node determines, based on the information about the first node and information about the target data, to send the target data through the first node.

The information about the target data includes at least one of: location information of a third node that receives the target data or an attribute of the target data.

The third node may be one or more terminals. For example, the third node is a terminal in the communications system shown in FIG. 1. The location information of the third node is used to indicate a location of the third node, and may be geographical location information of the third node, or may be network location information of the third node. The attribute of the target data may be that the target data is video data, or the target data is a file, or the target data is a V2N message, or the like.

Specifically, that the second node determines, based on the information about the first node and information about the target data, to send the target data through the first node may include: The second node determines an area based on location information of a plurality of third nodes. The second node searches, based on information about locally registered communications devices and the attribute of the target data, in the communications devices locally registered with the second node, for a communications device that supports the attribute of the target data, and uses the communications device as the first node, and the first node is used as a communications device that provides data routing for the third node in the area.

For example, the first node may be a communications device whose geographical location is closest to the area and whose service area can cover the area in the registered communications devices. A communications device closest to an area may be considered as a communications device closest to a center of the area.

Alternatively, the first node may be a communications device whose service area is located in the area or whose service area partially overlaps the area in the registered communications devices.

Alternatively, the first node may be a communications device whose supported message format matches the attribute of the target data, for example, a communications device supporting V2X message transmission, in the communications devices locally registered with the second node.

In the foregoing fifth implementation scenario, when the second node sends the target data to a terminal in an area, the first node is selected based on the information about the target data and the information about the first node. The first node may be a communications device near the third node that receives the target data, or may be a communications device that supports the attribute of the target data. The target data may be broadcast to the third node in the area through the first node. This greatly improves data delivery efficiency.

Optionally, in a sixth implementation scenario of the embodiment corresponding to FIG. 4, the second node pre-configures a plurality of communications devices that can provide data routing for the third node. In addition, the second node locally stores information about these communications devices. The second node may select any of the communications devices as the first node. The first node provides data routing for a third node in an area.

Optionally, in a seventh implementation scenario of the embodiment corresponding to FIG. 4, the second node may obtain information about the first node from another network device or another application server that holds the information about the first node. The network device that holds the information about the first node may be a unified data management (UDM) network element or a unified data repository (UDR) network element.

Figure 5:
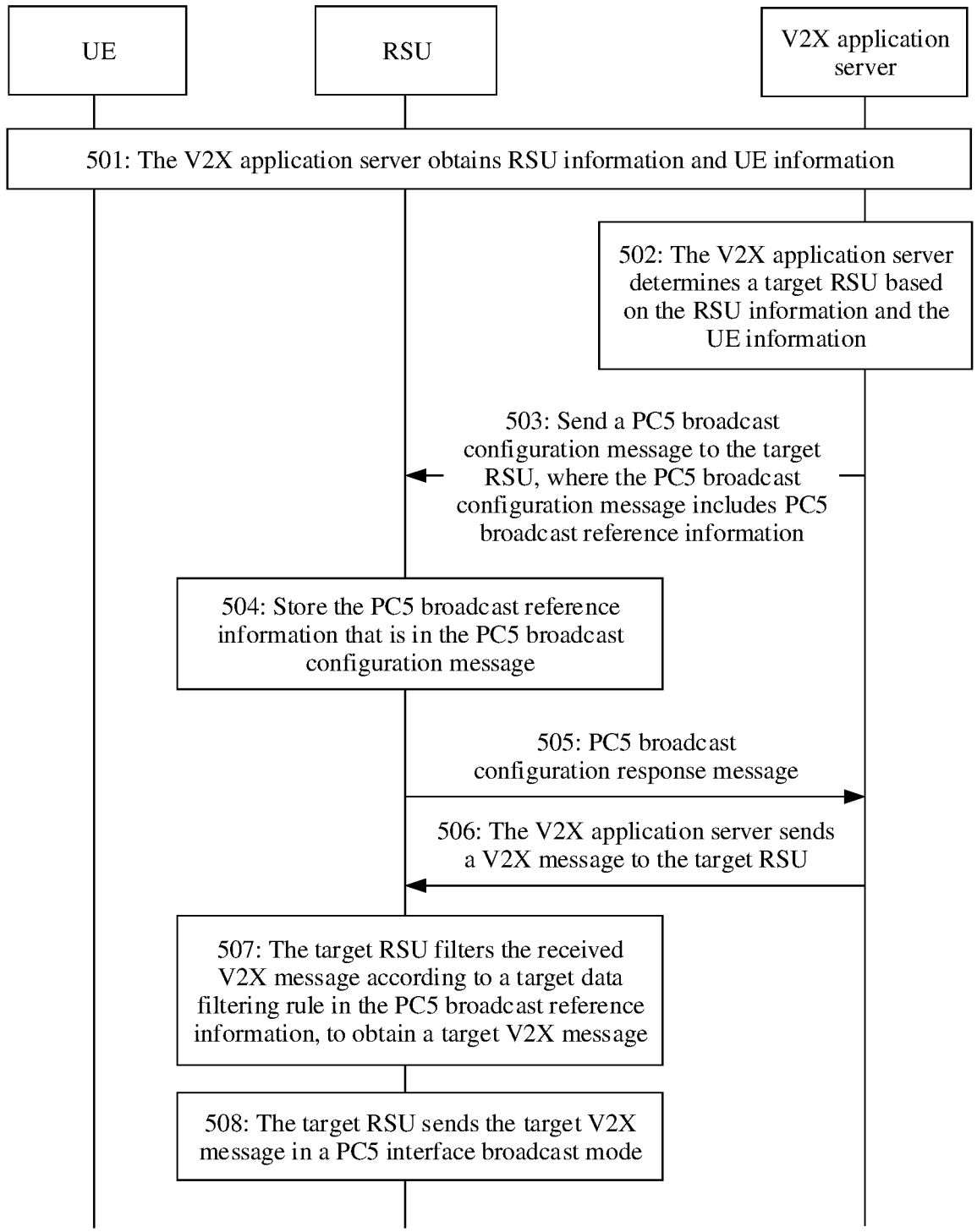
FIG. 5 is a schematic flowchart of another communication method according to an embodiment of this application.
Figure 6:
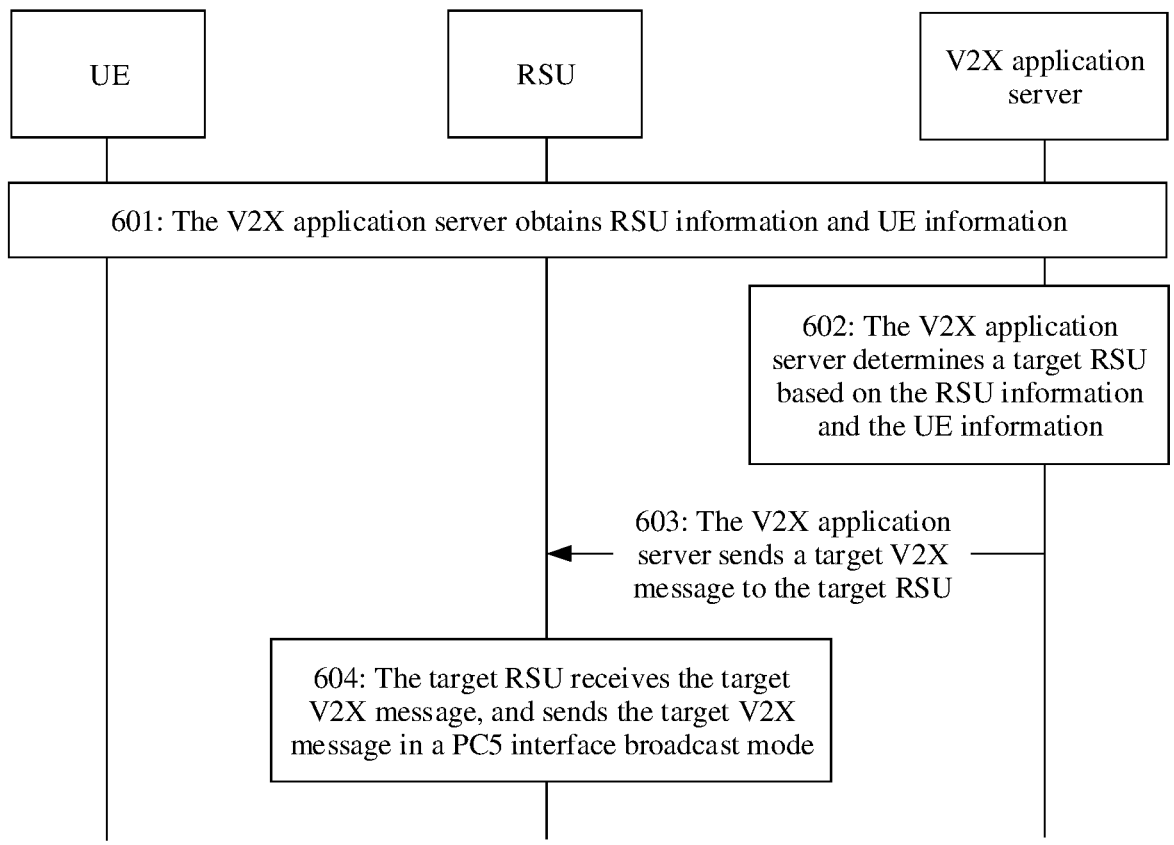
FIG. 6 is a schematic flowchart of another communication method according to an embodiment of this application.

In embodiments shown in FIG. 5 and FIG. 6, the communication method provided in the embodiments of this application is described in detail by using an example in which the first node is an RSU, the second node is a V2X application server, and the target data is a V2X message. As shown in FIG. 5, the method includes the following steps.

501: A V2X application server obtains RSU information and UE information.

For example, that the V2X application server obtains RSU information may include: An RSU sends a registration request to the V2X application server. The registration request includes the RSU information. The V2X application server receives the registration request of the RSU, and further obtains the RSU information.

The RSU information may include at least one of the following information: location information of the RSU, a service area of the RSU, capability information of the RSU, or the like. The location information of the RSU may be geographical location information of the RSU or network location information of the RSU.

For example, that the V2X application server obtains UE information may include: The UE may send the UE information to the V2X application server, or the V2X application server obtains the UE information from a 3GPP core network element (for example, an AMF).

The UE information may include UE location information, for example, geographical location information of the UE or network location information of the UE. The network location information of the UE may be a cell in which the UE is located, a TA in which the UE is located, or the like.

502: The V2X application server determines a target RSU based on the RSU information and the UE information.

In an example implementation, the V2X application server determines, based on the UE location information obtained in step 501, location information of UE (referred to as target UE for short below) that receives the V2X message.

Further, the V2X application server selects, as the target RSU, based on the location information of the target UE and information about locally registered RSUs, one of a plurality of RSUs locally registered with the V2X application server. For example, the V2X application server selects, as the target RSU, from the registered RSUs, an RSU that supports V2X message transmission and that is closest to the target UE.

It should be noted that steps 501 and 502 are optional steps and this is not limited in embodiments of the present disclosure.

503: The V2X application server sends a PC5 broadcast configuration message to the target RSU.

For example, the V2X application server sends, on a control plane, the PC5 broadcast configuration message to the target RSU.

The PC5 broadcast configuration message includes PC5 broadcast reference information. The PC5 broadcast reference information includes a target data filtering rule, and the target data filtering rule is used to filter to obtain a target V2X message.

It should be noted that, in this embodiment of this application, only the PC5 broadcast configuration message is used as an example, and the message may be replaced with another message name. This is not limited in embodiments of the present disclosure.

In addition, the target data filtering rule may be a port number, a V2X message type, or the like. For details, refer to related descriptions in the embodiment shown in FIG. 4. For example, when the target data filtering rule is a port number, the target V2X message is a V2X message with the port number. For another example, when the target data filtering rule is a V2X message type, the target V2X is a V2X message of this type.

Optionally, the PC5 broadcast reference information further includes a PC5 broadcast indicator and target data broadcast frequency information. For details, refer to related descriptions in the embodiment shown in FIG. 4.

504: The target RSU stores the PC5 broadcast reference information that is in the PC5 broadcast configuration message.

505: The target RSU replies with a PC5 broadcast configuration response message to the V2X application server.

506: The V2X application server sends a V2X message to the target RSU.

Correspondingly, the target RSU receives the V2X message from the V2X application server.

507: The target RSU filters the received V2X message according to the target data filtering rule in the PC5 broadcast reference information, to obtain the target V2X message.

For example, the target RSU filters the received V2X message according to the target data filtering rule in the PC5 broadcast reference information, to obtain the target V2X message, and sends the target V2X message in a PC5 interface broadcast mode.

In addition, for a non-target V2X message, the target RSU may perform other processing on data that is not identified according to the target data filtering rule. The other processing herein may be: The RSU parses unidentified data, discards unidentified data, or sends unidentified data to the UE in a point-to-point manner. This is not limited in embodiments of this application.

Specifically, the target RSU may filter a plurality of received V2X messages based on a V2X message type or a V2X message port number, to obtain the target V2X message, and send the target V2X message in the PC5 interface broadcast mode.

508: The target RSU sends the target V2X message in the PC5 interface broadcast mode.

It should be noted that the target UE may receive, through a PC5 interface, the target V2X message broadcast by the target RSU, to obtain information, for example, a road safety warning or road condition information, indicated by the target V2X message. In this way, a driving status (such as a vehicle speed and direction) can be adjusted based on the obtained information in a timely manner to effectively avoid risks.

The method provided in this embodiment of this application ensures efficient delivery of the V2X message. The V2X application server sends the PC5 broadcast reference information to the RSU, and the RSU may filter the target V2X message based on the PC5 broadcast reference information, and send the target V2X message in the PC5 interface broadcast mode, thereby saving PC5 interface bandwidth resources. In addition, the V2X application server sends, on the control plane, the PC5 broadcast reference information, so that the PC5 broadcast reference information can be flexibly configured. For example, when the target RSU changes, the PC5 broadcast reference information needs to be sent only to the changed target RSU. For another example, when the PC5 broadcast reference information changes, the PC5 broadcast reference information is updated on the control plane.

In a method shown in FIG. 6, a V2X application server may send, on a user plane, PC5 broadcast reference information to an RSU. The method includes the following steps:

601: The V2X application server obtains RSU information and UE information.

For step 601, refer to related descriptions of step 501. Details are not repeated herein.

602: The V2X application server determines a target RSU based on the RSU information and the UE information.

For step 602, refer to related descriptions of step 502. Details are not repeated herein.

It should be noted that step 601 and step 602 are optional steps, and this is not limited in embodiments of the present disclosure.

603: The V2X application server sends a target V2X message to the target RSU.

The target V2X message includes the PC5 broadcast reference information.

During specific implementation, the V2X application server may determine, based on a V2X service, a V2X message, namely, the target V2X message, sent in a PC5 interface broadcast mode. For example, when the V2X service is that the V2X application server delivers a V2N message to all UEs in an area, the target V2X message is the V2N message.

Further, the V2X application server adds the PC5 broadcast reference information to the target V2X message, and sends the target V2X message to the target RSU. For example, the V2X application server may add the PC5 broadcast reference information to a header of the target V2X message.

The PC5 broadcast reference information includes a PC5 broadcast indicator. For details, refer to related descriptions in the embodiment shown in FIG. 4. For example, the V2X application server adds a new indication field to a header of a V2X message, and the indication field is filled with the PC5 broadcast indicator.

604: The target RSU receives the target V2X message, and sends the target V2X message in the PC5 interface broadcast mode.

For example, the target RSU receives a V2X message from the V2X application server, and identifies the target V2X message from the received V2X message. Specifically, if a header of the V2X message includes the PC5 broadcast reference information (for example, the PC5 broadcast indicator), the V2X message is the target V2X message, and the target RSU sends the V2X message in the PC5 interface broadcast mode. If a header of the V2X message does not include the PC5 broadcast reference information, the V2X message is not the target V2X message, and the target RSU may perform other processing on the V2X message. The other processing herein may be discarding the message or sending the V2X message to UE in a point-to-point manner. This is not limited in embodiments of the present disclosure.

The method provided in this embodiment of this application ensures efficient delivery of the V2X message. Specifically, the V2X application server adds the PC5 broadcast reference information to the V2X message. After receiving the PC5 broadcast reference information in the V2X message, the RSU sends the V2X message in the PC5 interface broadcast mode, thereby saving PC5 interface bandwidth resources. In addition, the V2X application server sends, on a user plane, the PC5 broadcast reference information, so that each V2X message can be precisely controlled. The V2X application server may indicate, through one V2X message, the RSU to send the V2X message in the PC5 interface broadcast mode, and there is no need to perform a plurality of negotiations between the V2X application server and the RSU, thereby reducing negotiation signaling overheads.

In an example embodiment, after sending, on a control plane, the PC5 broadcast reference information to the RSU, the V2X application server may further indicate, on the user plane, the PC5 broadcast reference information. For example, after sending the PC5 broadcast reference information to the RSU through control signaling (for example, the PC5 broadcast configuration message), when actually sending the V2X message, the V2X application server adds the PC5 broadcast reference information to the V2X message.

It should be noted that, in the example embodiment, the PC5 broadcast reference information indicated by the V2X application server through the control signaling may include a target data filtering rule, the PC5 broadcast indicator, and target data broadcast frequency information. The PC5 broadcast reference information added by the V2X application server to the V2X message may include the PC5 broadcast indicator and the target data broadcast frequency information.

Figure 7:
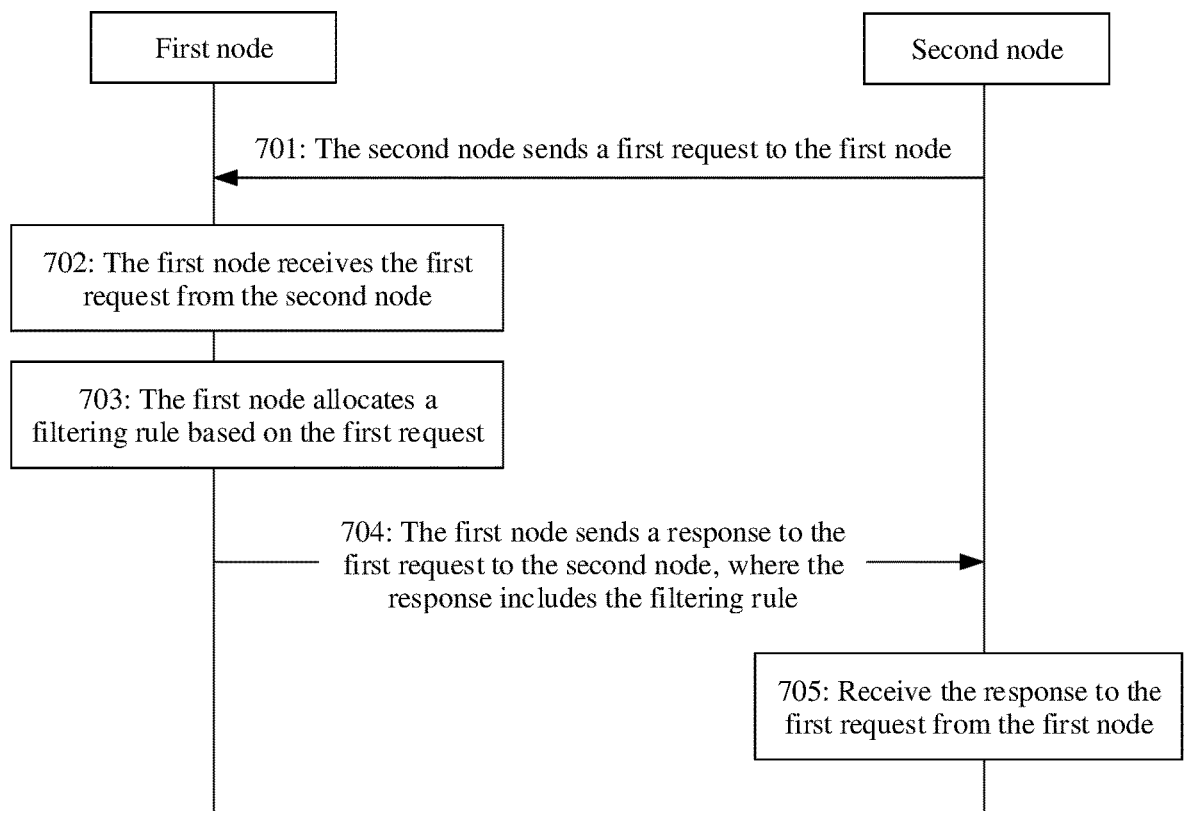
FIG. 7 is a schematic flowchart of another communication method according to an embodiment of this application.

An embodiment of this application further provides a communication method. The method may be applied to the communications system shown in FIG. 1. As shown in FIG. 7, the method includes the following steps.

701: A second node sends a first request to a first node.

The first request may be used to request to send target data from the second node in a PC5 interface broadcast mode.

It should be noted that, to efficiently deliver the target data, the second node may request the first node to send the target data in the PC5 interface broadcast mode. Specifically, the second node may send the first request to the first node.

The second node may be an application server, for example, the application server in the communications system shown in FIG. 1.

The first node may be a communications device having a data routing function, for example, the RSU in the communications system shown in FIG. 1.

The target data may be data sent in the PC5 interface broadcast mode.

Specifically, the target data may be at least one V2X message.

Specifically, the first request may be a broadcast transmission request message, or may be a PC5 broadcast transmission request message.

Specifically, the second node may send, on a Uu link, the first request to the first node. For example, when the first node is an RSU and the second node is an application server, referring to FIG. 1, the application server sends the first request to the UPF, and the UPF receives the first request from the application server and sends the first request to the access network device. The access network device receives the first request from the UPF, and the access network device sends, on the Uu link between the access network device and the RSU, the first request to the RSU.

702: The first node receives the first request from the second node.

During specific implementation, the first node may receive, on a Uu link, the first request.

703: The first node allocates a filtering rule based on the first request.

The filtering rule may be used by the first node to filter the target data sent by the second node, or may be used by the second node to send the target data.

It should be noted that, to efficiently deliver the target data, the second node needs to send the target data to the first node, and then the first node sends the target data in the PC5 interface broadcast mode. Therefore, after receiving the first request, the first node allocates the filtering rule in response to the first request. The allocating the filtering rule may also be understood as generating the filtering rule. In a subsequent process, the first node sends the filtering rule to the second node. The second node may send the target data to the first node according to the filtering rule. Further, the first node may filter the target data according to the filtering rule.

Specifically, the filtering rule may be a port number, and the port number may be allocated by the first node. The filtering rule may further include a user plane IP address, and the user plane IP address may be allocated by the first node.

704: The first node sends a response to the first request to the second node, where the response to the first request includes the filtering rule.

During specific implementation, the first node may send, on a Uu link, the response to the first request to the second node. For example, if the first node is an RSU and the second node is an application server, referring to FIG. 1, the RSU sends, on the Uu link between the RSU and the access network device, the response to the first request to the access network device. The access network device receives the response to the first request, and sends the response to the first request to the UPF. The UPF receives the response to the first request and sends the response to the first request to the application server.

705: The second node receives the response to the first request from the first node.

During specific implementation, the second node may receive, on a Uu link, the response to the first request from the first node.

In this embodiment of this application, to improve data delivery efficiency, the second node requests the first node to send the target data in the PC5 interface broadcast mode, the first node provides the filtering rule for the second node, and the second node may send the target data to the first node according to the filtering rule. In this manner, the first node may also identify the target data from the second node according to the filtering rule, so that the first node can send the target data in the PC5 interface broadcast mode. It can be learned that, in this embodiment of this application, the first node does not need to sequentially send the target data to each terminal in a one-to-one manner in a PC5 interface unicast mode, but sends the target data in the PC5 interface broadcast mode, thereby saving PC5 bandwidth resources and efficiently delivering the data.

Optionally, in a first implementation scenario of the embodiment corresponding to FIG. 7, after step 705, the second node may send the target data to the first node according to the filtering rule. The first node may filter, according to the filtering rule, received data to obtain the target data from the second node. Further, the first node sends the target data in the PC5 interface broadcast mode.

In an example embodiment, the filtering rule is a port number A, and the first node sends the port number A as the filtering rule to the second node. That the second node sends the target data to the first node according to the filtering rule may be specifically as follows: When the target data is encapsulated, a destination port number of the target data is set to the port number A, and a destination IP address of the target data is set to an IP address of the first node. The target data obtained by the first node through filtering according to the filtering rule may be specifically: Data received by the first node from the port number A is the target data from the second node. That the first node receives the data from the port number A may be understood as that a destination port number of the received data is the port number A.

In another example embodiment, the filtering rule is a port number B and a user plane IP address C. The first node sends the port number B and the user plane IP address C that are used as the filtering rule to the second node. That the second node sends the target data to the first node according to the filtering rule may be specifically as follows: When the target data is encapsulated, a destination port number of the target data is set to the port number B, and a destination IP address of the target data is set to the user plane IP address C. The target data obtained by the first node through filtering according to the filtering rule may be specifically as follows: If a destination port number of data received by the first node is the port number B, and a destination IP address of the data is the user plane IP address C, it is considered that the data is the target data from the second node.

Optionally, in a second implementation scenario of the embodiment corresponding to FIG. 7, that the first node sends the target data in the PC5 interface broadcast mode includes: The first node allocates a target protocol layer address to the target data, and the first node sends the target data in the PC5 interface broadcast mode based on the target protocol layer address. The target protocol layer address is used to send the target data at a target protocol layer in the PC5 interface broadcast mode. It may be understood that the target protocol layer address is a source address of the target data.

Specifically, the target protocol layer address may be an address at which the first node broadcasts the target data at the target protocol layer through a PC5 interface. For example, the target protocol layer address is a prose layer-2 address, and the source address of the target data sent by the first node in the PC5 interface broadcast mode is the prose layer-2 address.

It should be noted that prose layer-2 refers to a bottom layer of protocol layers of the first node. For example, the bottom layer of the protocol layers of the first node includes a MAC layer.

Optionally, in a third implementation scenario of the embodiment corresponding to FIG. 7, the first node may further send a target protocol layer address to the second node by using the response to the first request. For example, the response to the first request further includes the target protocol layer address.

Optionally, in a fourth implementation scenario of the embodiment corresponding to FIG. 7, after receiving a target protocol layer address from the first node, the second node sends the target protocol layer address to a third node.

Correspondingly, the third node may identify, based on the target protocol layer address from the second node, the target data sent by the first node in the PC5 interface broadcast mode.

Specifically, a message sent by the second node to the third node includes the target protocol layer address. For example, a PC5 broadcast announcement message sent by the second node to the third node includes the target protocol layer address.

Figure 8:
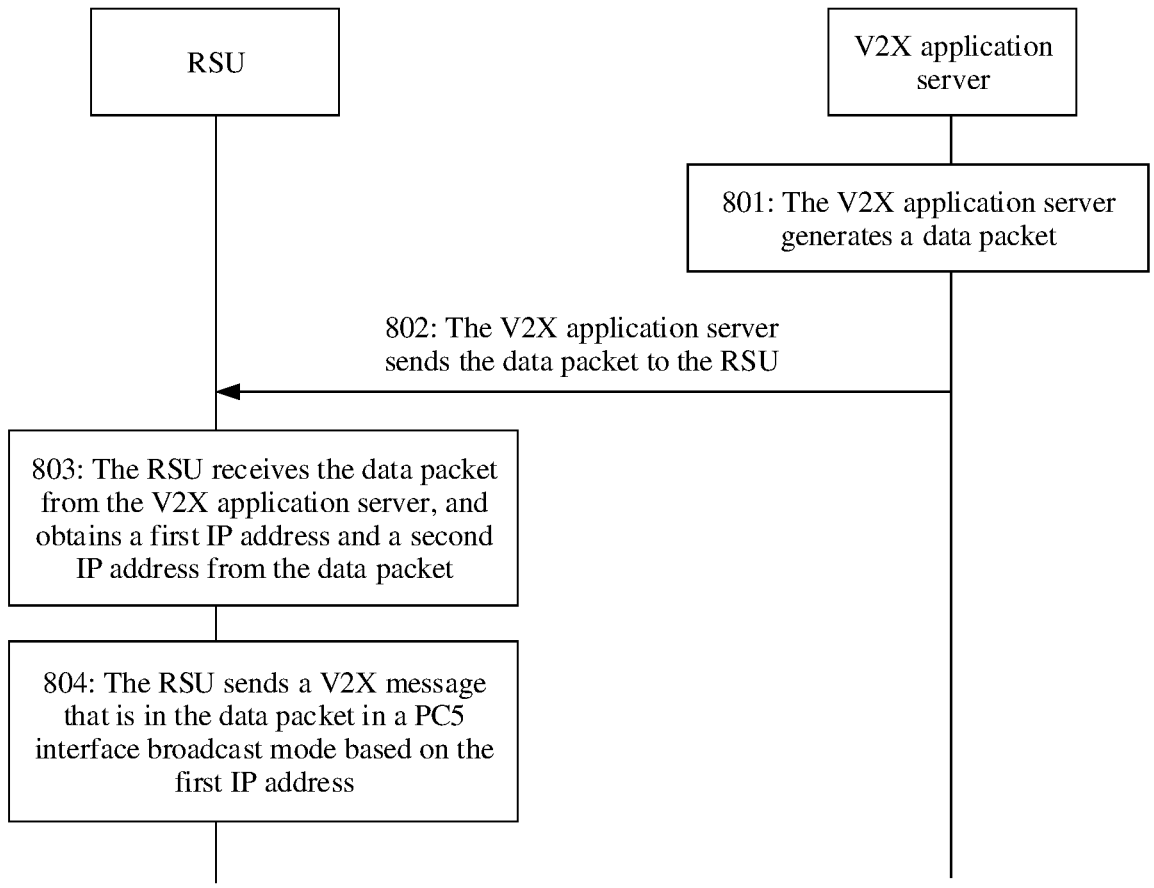
FIG. 8 is a schematic flowchart of another communication method according to an embodiment of this application.

An embodiment of this application further provides a communication method. As shown in FIG. 8, the method includes the following steps.

801: A V2X application server generates a data packet.

The data packet may include a V2X message, a first IP address, and a second IP address.

The first IP address indicates that there are a plurality of receive ends of the V2X message in the data packet, and the V2X message in the data packet is sent in a PC5 interface broadcast mode. For example, the first IP address may be a broadcast address or a multicast address, or the first IP address is a special IP address or port number. In addition, the second IP address may be an IP address and/or a port number of an RSU.

In an example embodiment, the V2X application server first encapsulates the V2X message at an application layer, an IP sublayer, an IP layer, a PDCP layer, an RLC layer, a MAC layer, and a PHY layer in sequence, and then sends the V2X message to the RSU. Specifically, the V2X message and the first IP address are encapsulated at the IP sublayer to obtain a protocol data unit (PDU).

Further, the obtained PDU is delivered to the IP layer, and the second IP address and the PDU submitted by the upper layer are encapsulated at the IP layer to obtain an IP sublayer PDU. Then, encapsulation is performed at the IP layer, the PDCP layer, the RLC layer, the MAC layer, and the PHY layer in sequence. Finally, a data packet encapsulated at the PHY layer is sent to the RSU.

802: The V2X application server sends the data packet to the RSU.

803: The RSU receives the data packet from the V2X application server and obtains the first IP address and the second IP address from the data packet.

During specific implementation, the RSU receives the data packet from the RSU, and parses the data packet at the protocol layers in sequence. Specifically, an address of the RSU, that is, the second IP address, is parsed out at the IP layer. After identifying the IP address of the RSU, the RSU delivers the parsed data packet to the IP sublayer for processing, and parses out the first IP address at the IP sublayer. If the RSU identifies that the first IP address is a broadcast address, step 804 is performed.

804: The RSU sends the V2X message in the data packet in the PC5 interface broadcast mode based on the first IP address.

The method provided in this embodiment of this application ensures efficient delivery of the V2X message. Specifically, the V2X application server performs two-layer encapsulation on the V2X message. The broadcast address is encapsulated in a in an inner layer, and the RSU address is encapsulated in an outer layer. After receiving the data packet from the V2X application server, the RSU identifies the broadcast address encapsulated in the inner layer, and sends the V2X message in the data packet in the PC5 interface broadcast mode, thereby saving PC5 interface bandwidth resources.

It should be noted that steps or nouns in the embodiments of this application may be mutually referenced. This is not limited in embodiments of the present disclosure.

Figure 9:
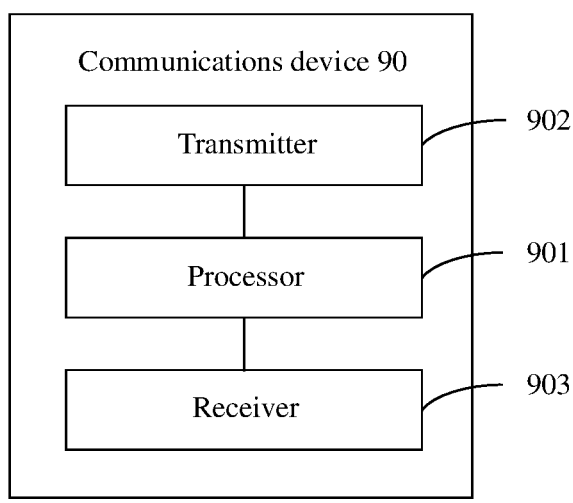
FIG. 9 is a schematic composition diagram of another communications device according to an embodiment of this application.

When each function module is obtained through division based on each corresponding function, FIG. 9 shows an example schematic structural diagram of a communications device 90 according to an embodiment of this application. The communications device 90 may be the first node in the embodiments of this application. For example, the communications device 90 is the RSU in the communications system shown in FIG. 1. As shown in FIG. 9, the communications device 90 includes a processor 901, a transmitter 902, and a receiver 903.

For the receiver 903, in the embodiment corresponding to FIG. 4, the receiver 903 is configured to support the first node in performing step 402 of receiving the PC5 broadcast reference information from the second node. In the embodiment corresponding to FIG. 5, the receiver 903 is further configured to support the RSU in receiving the PC5 broadcast configuration message sent by the V2X application server, and support the RSU in receiving the V2X message sent by the V2X application server. In the embodiment corresponding to FIG. 6, the receiver 903 is further configured to support the RSU in receiving the target V2X message sent by the V2X application server. In the embodiment corresponding to FIG. 7, the receiver 903 is configured to support the first node in performing step 702 of receiving the first request from the second node. In the embodiment corresponding to FIG. 8, the receiver 903 is configured to support the RSU in receiving the data packet from the V2X application server.

For the processor 901, in the embodiment corresponding to FIG. 4, the processor 901 is configured to support the first node in performing step 403 of sending the target data in the PC5 interface broadcast mode based on the PC5 broadcast reference information. In the embodiment corresponding to FIG. 5, the processor 901 is configured to support the RSU in performing step 504, step 507, and step 508. In the embodiment corresponding to FIG. 6, the processor 901 is configured to support the RSU in performing step 604. In the embodiment corresponding to FIG. 7, the processor 901 is configured to support the first node in performing step 703 of allocating the target address based on the first request. In the embodiment corresponding to FIG. 8, the processor 901 is configured to support the RSU in performing a process of "obtaining the first IP address and the second IP address from the data packet" in step 803, and in performing step 804.

For the transmitter 902, in the embodiment corresponding to FIG. 5, the transmitter 902 is configured to support the RSU in performing step 505. In the embodiment corresponding to FIG. 7, the transmitter 902 is configured to support the first node in performing step 704 of sending the response to the first request to the second node.

It should be noted that all related content of the steps in the foregoing method embodiments may be cited in function descriptions of corresponding function modules. Details are not repeated herein. The communications device 90 provided in this embodiment of this application is configured to perform a function of the first node or the RSU in the communication methods shown in FIG. 4 to FIG. 8. Therefore, an effect the same as that of the foregoing communication method can be achieved.

Figure 10:
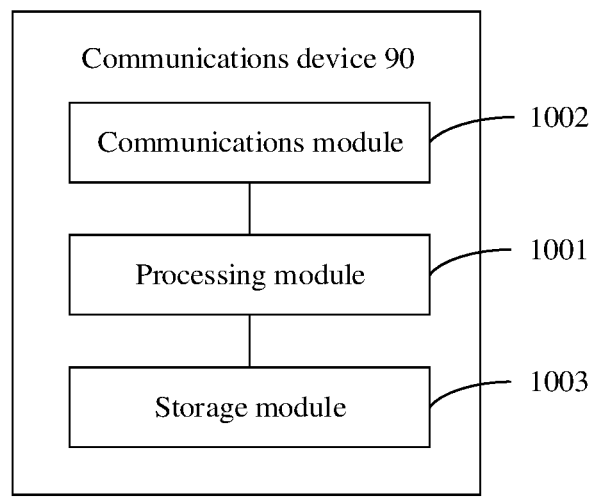
FIG. 10 is a schematic composition diagram of another communications device according to an embodiment of this application.

For example, when an integrated unit is used, FIG. 10 is a schematic structural diagram of a communications device 90 according to an embodiment of this application. In FIG. 10, the communications device 90 includes a processing module 1001 and a communications module 1002. The processing module 1001 is configured to control and manage actions of the communications device, for example, perform the steps performed by the processor 901, and/or another process in the technology described in this specification. The communications module 1002 is configured to perform the steps performed by the transmitter 902 and the receiver 903, and support interaction between the communications device and another device, for example, interaction between the communications device and a second node or a V2X application server. As shown in FIG. 10, the communications device may further include a storage module 1003, and the storage module 1003 is configured to store program code and data of the communications device.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module 1001 is a processor, the communications module 1002 is a communications interface and a transmitter, and the storage module 1003 is a memory, the communications device is the communications device shown in FIG. 3.

The communications interface 23 is configured to support receiving PC5 broadcast reference information from the second node. The processor 21 is configured to support sending target data through the transmitter 25 in a PC5 interface broadcast mode based on the PC5 broadcast reference information.

Figure 11:
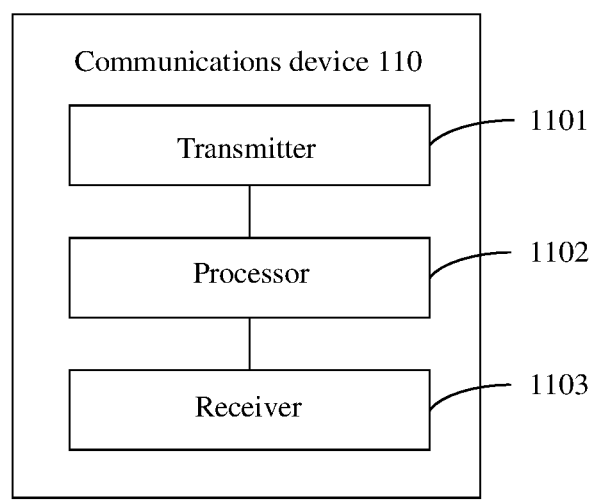
FIG. 11 is a schematic composition diagram of another communications device according to an embodiment of this application.

When each function module is obtained through division based on each corresponding function, FIG. 11 shows an example schematic structural diagram of a communications device 110 according to an embodiment of this application. The communications device 110 may be the second node in the embodiments of this application. For example, the communications device 110 is the application server in the communications system shown in FIG. 1. As shown in FIG. 11, the communications device 110 includes a transmitter 1101, a processor 1102, and a receiver 1103.

For the transmitter 1101, in the embodiment corresponding to FIG. 4, the transmitter 1101 is configured to support the second node in performing a process of "sending the PC5 broadcast reference information to the first node" in step 401. In the embodiment corresponding to FIG. 5, the transmitter 1101 is configured to support the V2X application server in performing step 503 and step 506. In the embodiment corresponding to FIG. 6, the transmitter 1101 is configured to support the V2X application server in performing step 603. In the embodiment corresponding to FIG. 7, the transmitter 1101 is configured to support the second node in performing step 701 of sending the first request to the first node. In the embodiment corresponding to FIG. 8, the transmitter 1101 is configured to support the V2X application server in performing step 802.

For the processor 1102, in the embodiment corresponding to FIG. 4, the processor 1102 is configured to support the second node in performing a process of "obtaining the PC5 broadcast reference information" in step 401. In the embodiment corresponding to FIG. 5, the processor 1102 is configured to support the V2X application server in performing step 502. In the embodiment corresponding to FIG. 6, the processor 1102 is configured to support the V2X application server in performing step 602. In the embodiment corresponding to FIG. 8, the processor 1102 is configured to support the V2X application server in performing step 801.

For the receiver 1103, in the embodiment corresponding to FIG. 4, the receiver 1103 is configured to support the second node in receiving the information about the first node. In the embodiment corresponding to FIG. 5, the receiver 1103 may be configured to: support the V2X application server in performing step 501 to receive the registration request of the RSU, so that the V2X application server can obtain the information about the RSU, and support the V2X application server in receiving the PC5 broadcast configuration response message sent by the RSU. In the embodiment corresponding to FIG. 6, the receiver 1103 is configured to support the V2X application server in performing step 601 to receive the registration request of the RSU, so that the V2X application server can obtain the information about the RSU. In the embodiment corresponding to FIG. 7, the receiver 1103 is configured to support the second node in performing step 705.

It should be noted that all related content of the steps in the foregoing method embodiments may be cited in function descriptions of corresponding function modules. Details are not repeated herein. The communications device 110 provided in this embodiment of this application is configured to perform functions of the second node or the V2X application server in the communication methods shown in FIG. 4 to FIG. 8. Therefore, an effect the same as that of the foregoing communication methods can be achieved.

Figure 12:
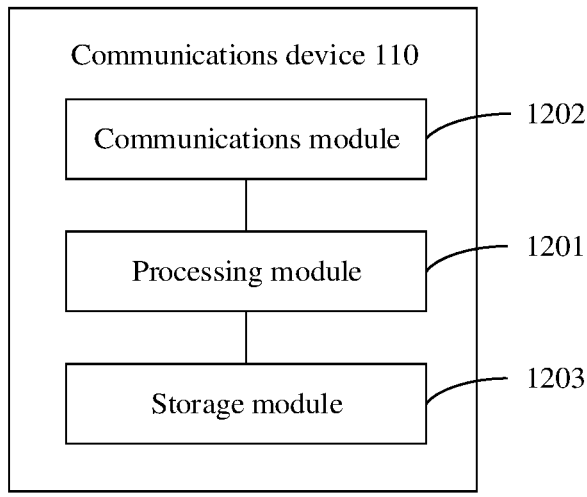
FIG. 12 is a schematic composition diagram of another communications device according to an embodiment of this application.

For example, when an integrated unit is used, FIG. 12 is a schematic structural diagram of a communications device 110 according to an embodiment of this application. In FIG. 12, the communications device includes a processing module 1201 and a communications module 1202. The processing module 1201 is configured to control and manage actions of the communications device, for example, perform the steps performed by the processor 1102, and/or another process in the technology described in this specification. The communications module 1202 is configured to perform the steps performed by the transmitter 1101 and the receiver 1103, and support interaction between the communications device 110 and another device, for example, interaction between the communications device and a first node or an RSU. As shown in FIG. 12, the communications device may further include a storage module 1203, and the storage module 1203 is configured to store program code and data of the communications device.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module 1201 is a processor, the communications module 1202 is a communications interface, and the storage module 1203 is a memory, the communications device 110 is a communications device shown in FIG. 13.

Figure 13:
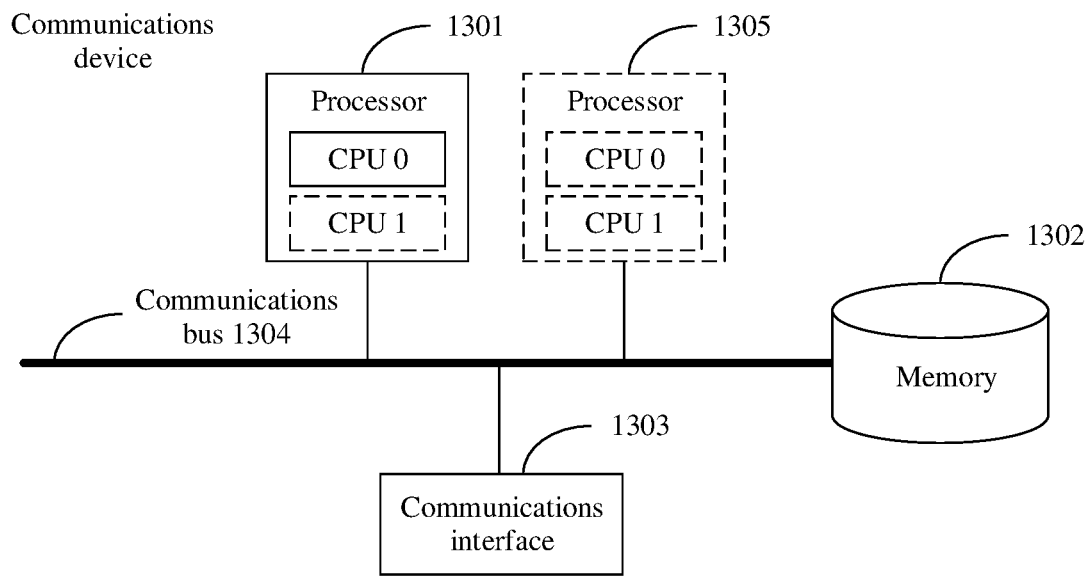
FIG. 13 is a schematic composition diagram of another communications device according to an embodiment of this application.

As shown in FIG. 13, the communications device includes at least one processor 1301, a memory 1302, a communications interface 1303, and a communications bus 1304. The following describes components of the communications device in detail with reference to FIG. 13.

The processor 1301 may be one processor, or may be a collective name of a plurality of processing elements. In addition, the processor 1301 may be a central processing unit (CPU), or may be an application-specific integrated circuit (ASIC), or may be configured as one or more integrated circuits for implementing the embodiments of this application, for example, one or more digital signal processors (DSP) or one or more field programmable gate arrays (FPGA).

The processor 1301 may run or execute a program stored in the memory 1302, to perform steps described in the embodiments of this application. When the communications device is an RSU, the processor 1301 may run or execute the program stored in the memory 1302, to perform actions or steps of the first node in method embodiments of this application. Alternatively, when the communications device is a V2X application server, the processor 1301 may run or execute the program stored in the memory 1302, to perform actions or steps of a second node in method embodiments of this application.

In an implementation, the communications device may include a plurality of processors, for example, the processor 1301 and a processor 1305 shown in FIG. 13. Each of these processors may be a single-core processor (single-CPU), or may be a multi-core processor (multi-CPU). The processor herein may be one or more devices, circuits, and/or processing cores for processing data (for example, computer program instructions).

In an implementation, one processor (for example, the processor 1301 or the processor 1305) of the communications device may include one or more CPUs, for example, a CPU 0 and a CPU 1 shown in FIG. 13.

The memory 1302 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that is accessible by a computer, but is not limited thereto. The memory 1302 may exist independently, and is connected to the processor 1301 through the communications bus 1304. Alternatively, the memory 1302 may be integrated with the processor 1301. The memory 1302 is configured to store a software program for performing the solutions of this application, and the processor 1301 controls the execution.

The communications interface 1303 is configured to support communication between the communications device and another communications device. For example, the RSU is connected to the V2X application server in a wired manner. The RSU may send data to the V2X application server through the communications interface 1303, or may receive, through the communications interface 1303, data sent by the V2X application server.

The communications bus 1304 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 13, but this does not mean that there is only one bus or only one type of bus.

It should be noted that the components shown in FIG. 13 do not constitute a limitation on the communications device. In addition to the components shown in FIG. 13, the communications device may include more or fewer components than those shown in the figure, or some components may be combined, or different component arrangements may be used.

An embodiment of this application further provides a computer-readable storage medium. Specifically, the computer-readable storage medium stores instructions, that when executed by the at least one processor, cause the processor to perform the communication methods shown in FIG. 4 to FIG. 8. For example, when the instructions in the computer-readable storage medium run, the first node is enabled to receive the PC5 broadcast reference information from the second node, and send the target data in the PC5 interface broadcast mode based on the PC5 broadcast reference information.

An embodiment of this application further provides a chip system. The chip system includes a processor and a communications interface, and is configured to support a communications device (for example, the first node or the second node described in the embodiments of this application) in implementing the communication methods shown in FIG. 4 to FIG. 8. For example, the chip system is configured to support the first node in receiving the PC5 broadcast reference information from the second node, and sending the target data in the PC5 interface broadcast mode based on the PC5 broadcast reference information.

In an example embodiment, the chip system further includes a memory. The memory is configured to store program instructions and data that are necessary for the communications apparatus. The chip system may include a chip, or may include a chip and another discrete component.

The foregoing description about implementations allows a person of ordinary skill in the art to understand that, for ease and brevity of description, division into the foregoing function modules is used as an example for description. During actual application, the foregoing functions may be allocated to different modules and implemented based on a requirement. In other words, an inner structure of the communications device is divided into different function modules to implement all or some of the functions described above.

In the several embodiments provided in this application, it should be understood that the disclosed communications device and method may be implemented in another manner. For example, the described communications device embodiment is merely an example. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the communications devices or units may be implemented in electric, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely non-limiting examples of specific implementations and are not intended to limit the protection scope, which is intended to cover any variation or replacement within the technical scope disclosed in this application. Therefore, the claims shall define the protection scope.

What is claimed is:

1. A communication method, comprising:
   receiving, by a first node, PC5 broadcast reference information from a second node, wherein the PC5 broadcast reference information indicates to send target data from the second node in a PC5 interface broadcast mode; and
   sending, by the first node, the target data in the PC5 interface broadcast mode based on the PC5 broadcast reference information,
   wherein the PC5 broadcast reference information comprises a target data filtering rule for filtering data from the second node to obtain the target data; and
   the sending, by the first node, the target data in the PC5 interface broadcast mode based on the PC5 broadcast reference information comprises:
   filtering, by the first node, the data from the second node according to the target data filtering rule, to obtain the target data; and
   sending, by the first node, the target data in the PC5 interface broadcast mode.

2. The method according to claim 1, wherein the PC5 broadcast reference information is carried in control signaling.

3. The method according to claim 1, wherein the PC5 broadcast reference information further comprises a PC5 broadcast indicator and/or target data broadcast frequency information, wherein
   the PC5 broadcast indicator indicates to send the target data in the PC5 interface broadcast mode, and the target data broadcast frequency information indicates a frequency for broadcasting the target data.

4. The method according to claim 1, wherein the receiving, by the first node, PC5 broadcast reference information from the second node comprises:
   receiving, by the first node, the target data from the second node, wherein the target data comprises the PC5 broadcast reference information.

5. The method according to claim 1, wherein the PC5 broadcast reference information comprises a PC5 broadcast indicator, and the PC5 broadcast indicator indicates to send the target data in the PC5 interface broadcast mode.

6. The method according to claim 1, wherein the first node is a roadside unit (RSU) of a user equipment (UE) type, and the second node is a vehicle-to-everything (V2X) application server.

7. A communication method, comprising:
   obtaining, by a second node, PC5 broadcast reference information, wherein the PC5 broadcast reference information indicates to send target data in a PC5 interface broadcast mode; and
   sending, by the second node, the PC5 broadcast reference information to a first node for the first node to send the target data in the PC5 interface broadcast mode based on the PC5 broadcast reference information,
   wherein the PC5 broadcast reference information comprises a target data filtering rule for filtering data from the second node to obtain the target data; and
   the sending of the target in the PC5 interface broadcast mode based on the PC5 broadcast reference information comprises:
   filtering the data from the second node according to the target data filtering rule, to obtain the target data; and
   sending the target data in the PC5 interface broadcast mode.

8. The method according to claim 7, further comprising:
   sending, by the second node, the target data to the first node.

9. The method according to claim 8, further comprising:
receiving, by the second node, information about the first node; and
determining, by the second node based on the information about the first node, to broadcast the target data through the first node.

10. The method according to claim 9, wherein the information about the first node comprises an identifier of the first node and at least one of:
location information of the first node, a service area of the first node, capability information of the first node, or information about a service provided by the first node.

11. The method according to claim 9, wherein the determining, by the second node based on the information about the first node, to broadcast the target data through the first node comprises:
determining, by the second node based on the information about the first node and information about the target data, to send the target data through the first node, wherein
the information about the target data comprises at least one of: location information of a third node that receives the target data or an attribute of the target data.

12. The method according to claim 8, wherein the sending, by the second node, the target data to the first node comprises:
sending, by the second node, on a Uu link, the target data to the first node.

13. The method according to claim 7, wherein the PC5 broadcast reference information is carried in control signaling.

14. The method according to claim 7, wherein the PC5 broadcast reference information further comprises a PC5 broadcast indicator and/or target data broadcast frequency information, wherein the PC5 broadcast indicator indicates to send the target data in the PC5 interface broadcast mode, and the target data broadcast frequency information indicates a frequency for broadcasting the target data.

15. The method according to claim 7, wherein the target data comprises the PC5 broadcast reference information, the PC5 broadcast reference information comprises a PC5 broadcast indicator, and the PC5 broadcast indicator indicates to send the target data in the PC5 interface broadcast mode.

16. The method according to claim 7, wherein the first node is a roadside unit (RSU) of a user equipment (UE) type, and the second node is a vehicle-to-everything (V2X) application server.

17. A communication system, comprising a first node and a second node, wherein
the second node is configured to obtain PC5 broadcast reference information, wherein the PC5 broadcast reference information indicates to send target data in a PC5 interface broadcast mode, and send the PC5 broadcast reference information to the first node; and
the first node is configured to receive the PC5 broadcast reference information from the second node, and send the target data in the PC5 interface broadcast mode based on the PC5 broadcast reference information,
wherein the PC5 broadcast reference information comprises a target data filtering rule for filtering data from the second node to obtain the target data; and
the first node is further configured to filter the data from the second node according to the target data filtering rule to obtain the target data, and send the target data in the PC5 interface broadcast mode.

* * * * *

UNITED STATES PATENT AND TRADEMARK OFFICE
CERTIFICATE OF CORRECTION

PATENT NO. : 11,902,860 B2
APPLICATION NO. : 17/358310
DATED : February 13, 2024
INVENTOR(S) : Cuili Ge It is certified that error appears in the above-identified patent and that said Letters Patent is hereby corrected as shown below:

In the Claims

Column 34, Claim 7, Line 13, change "target in the PC5," to --target data in the PC5--.

Signed and Sealed this
Twelfth Day of March, 2024

Katherine Kelly Vidal
*Director of the United States Patent and Trademark Office*